United States Patent
Li et al.

(10) Patent No.: US 10,959,230 B2
(45) Date of Patent: Mar. 23, 2021

(54) SUBFRAME PROCESSING METHOD AND DEVICE

(71) Applicant: Huawei Technologies Co., Ltd., Shenzhen (CN)

(72) Inventors: Bingzhao Li, Beijing (CN); Wei Quan, Beijing (CN); Jian Zhang, Beijing (CN); Zhenxing Hu, Shenzhen (CN); Xiaodong Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/530,584

(22) Filed: Aug. 2, 2019

(65) Prior Publication Data
US 2019/0357217 A1 Nov. 21, 2019

Related U.S. Application Data

(63) Continuation of application No. 15/393,691, filed on Dec. 29, 2016, now Pat. No. 10,383,121, which is a
(Continued)

(51) Int. Cl.
*H04W 72/04* (2009.01)
*H04W 72/00* (2009.01)
(Continued)

(52) U.S. Cl.
CPC ..... *H04W 72/0453* (2013.01); *H04W 72/005* (2013.01); *H04W 72/04* (2013.01);
(Continued)

(58) Field of Classification Search
CPC .......... H04W 72/0453; H04W 72/005; H04W 72/042; H04W 72/04; H04W 74/006; H04W 74/0808
See application file for complete search history.

(56) References Cited

U.S. PATENT DOCUMENTS

2010/0103901 A1* 4/2010 Miki ............... H04L 1/003
370/330
2013/0196679 A1* 8/2013 Widell ............. H04W 74/085
455/453
(Continued)

FOREIGN PATENT DOCUMENTS

| CN | 101222751 A | 7/2008 |
| CN | 102056303 A | 5/2011 |

(Continued)

OTHER PUBLICATIONS

Dahlman et al., "Chapter 14: Access Procedures" in "4G LTE/LTE-Advanced for Mobile Broadband", Published by Elsevier Ltd., 2011, pp. 301-302. (Year: 2011).*
(Continued)

*Primary Examiner* — Shailendra Kumar
(74) *Attorney, Agent, or Firm* — Slater Matsil, LLP

(57) ABSTRACT

A subframe processing method and device are disclosed. A terminal can determine a special subframe in a non-contiguous secondary carrier according to a maximum continuous channel occupancy duration and a channel listening duration of the non-contiguous secondary carrier, and a channel occupancy start reference time point and/or a channel listening start reference time point of the non-contiguous secondary carrier that are obtained, where the special subframe includes all or some gap symbols occupied by the channel listening duration, use all symbols except the gap symbols in the special subframe as symbols that can be occupied by a PDCCH and/or a PDSCH, and correspondingly receive or decode the PDCCH and/or the PDSCH in the special subframe according to the symbols that can be occupied by the PDCCH and/or the PDSCH.

18 Claims, 5 Drawing Sheets

Related U.S. Application Data continuation of application No. PCT/CN2014/081263, filed on Jun. 30, 2014.

(51) Int. Cl.
    *H04W 74/00*     (2009.01)
    *H04W 74/08*     (2009.01)

(52) U.S. Cl.
    CPC ........ *H04W 72/042* (2013.01); *H04W 74/006* (2013.01); *H04W 74/0808* (2013.01)

(56) References Cited

U.S. PATENT DOCUMENTS

| | | | | |
|---|---|---|---|---|
| 2015/0110066 A1* | 4/2015 | Gaal | ................. | H04W 72/0453 370/330 |
| 2015/0163805 A1* | 6/2015 | Cattoni | ............... | H04W 74/006 370/329 |
| 2015/0264699 A1* | 9/2015 | Fwu | ....................... | H04L 5/0001 370/329 |
| 2017/0118728 A1* | 4/2017 | Harada | ................. | H04W 52/38 |

FOREIGN PATENT DOCUMENTS

| | | |
|---|---|---|
| CN | 102612133 A | 7/2012 |
| CN | 103391179 A | 11/2013 |
| CN | 103391583 A | 11/2013 |
| CN | 103516475 A | 1/2014 |
| CN | 103621146 A | 3/2014 |
| EP | 1865733 A1 | 12/2007 |
| EP | 2124368 A1 | 11/2009 |
| EP | 2328365 A1 | 6/2011 |
| WO | 2012024913 A1 | 3/2012 |
| WO | 2012050503 A1 | 4/2012 |
| WO | 2013070173 A1 | 5/2013 |

OTHER PUBLICATIONS

Fiberhome, "Further Consideration on the Collision between PSS/SSS and DM-RS," 3GPP TSG-RAN WG1, Meeting #74, R1-133352, Aug. 2013, pp. 1-3.

Huang, C. "Performance Study of Carver Aggregation in Homogeneous and Heterogeneous Networks," Beijing University of Posts and Telecommunications, 2011, 75 pages.

Huawei et al., "Detailed Solutions for Carrier Selection and LBT for LAA," 3GPP TSG-RAN WG1 Meeting #79, R1-144591, Nov. 2014, pp. 1-5.

Nokia et al., "General Considerations on New Carrier Types," 3GPP TSG-RAN WG1 #68 R1-120832, Feb. 2012, pp. 1-4.

Sharp, "Discussions on Additional Carrier Types," 3GPP TSG-RAN WG1 Meeting #66bis, R1-113346, Oct. 2011, pp. 1-3.

Yan, Y. et al., "Enhanced Downlink Control Channel Resource Allocation Algorithm for Cross-Carrier Scheduling in LTE-Advanced Carrier Aggregation System," 2011 IEEE 73rd Vehicular Technology Conference (VTC Spring), 5 pages.

* cited by examiner

SUBFRAME PROCESSING METHOD AND DEVICE

CROSS-REFERENCE TO RELATED APPLICATIONS

This application is a continuation of U.S. patent application Ser. No. 15/393,691, filed on Dec. 29, 2016, which is a continuation of International Application No. PCT/CN2014/081263, filed on Jun. 30, 2014. All of the afore-mentioned patent applications are hereby incorporated by reference in their entireties.

TECHNICAL FIELD

The present invention relates to the field of communications technologies, and in particular, to a subframe processing method and device.

BACKGROUND

In an LTE (Long Term Evolution) system or an LTE-A (LTE-Advanced, Long Term Evolution Advanced) system, to increase uplink and downlink peak rates in the system, a CA (Carrier Aggregation) technology is introduced, that is, a plurality of contiguous or non-contiguous carriers is aggregated to simultaneously serve UE (User Equipment) when necessary, so as to provide a required rate. The CA technology may be used to maximize resource utilization and effectively utilize discrete spectrum resources.

Specifically, in the CA technology, a network-side device such as a base station may configure a plurality of operating carriers for each UE, where one carrier is a primary carrier, and the other carriers are secondary carriers. In addition, to maximize resource utilization, each secondary carrier may be configured in an unlicensed spectrum. The unlicensed spectrum generally refers to a common spectrum, that is, a spectrum that can be used by any organization or any individual. Therefore, generally, a rule of listening before transmitting needs to be followed in the use of the unlicensed spectrum, that is, a signal can be transmitted in the unlicensed spectrum only when it is detected that the spectrum is idle. In other words, if a secondary carrier is deployed in the unlicensed spectrum, the rule of listening before transmitting also needs to be followed in the use of the secondary carrier. Therefore, transmission in the secondary carrier may be discontinuous.

Specifically, for a non-contiguous carrier deployed in a spectrum such as an unlicensed spectrum, a base station may generally perform a CCA (Clear Channel Assessment) to assess whether a channel occupied by the non-contiguous carrier is idle, so as to determine whether the channel can be used. Generally, when the base station performs the CCA, a minimum duration of the CCA (which may also be referred to as a channel listening duration or a channel assessment duration) is not shorter than 20 s. In addition, a maximum duration in which the base station transmits a signal by using the non-contiguous carrier every time cannot exceed 13 ms (that is, a maximum continuous channel occupancy duration of the non-contiguous carrier cannot exceed 13 ms). In addition, if the base station determines that the channel is not occupied by other devices for a long time, the base station periodically occupies the channel, where every two durations of occupancy by the base station may be separated by a CCA.

It can be known from the foregoing content that, for any UE, when there is a non-contiguous carrier in a plurality of operating carriers configured for the UE, there is a minimum duration of 20S (namely, a CCA duration) in which the non-contiguous carrier cannot transmit any signal. Although the CCA duration may occupy merely less than one symbol in a subframe, because the UE does not know a time point at which the CCA occurs, the UE cannot exclude the symbol occupied by the CCA from the entire subframe in which the CCA occurs. Consequently, no signal can be transmitted in 14 symbols of the entire subframe in which the CCA occurs, and resource utilization is reduced.

SUMMARY

Embodiments of the present invention provide a subframe processing method and device to resolve a currently existing problem that resource utilization is low because a gap symbol caused by a CCA cannot be excluded from an entire subframe.

According to a first aspect, a network-side device is provided. The network-side device includes an information determining module, configured to determine first carrier configuration information of a first secondary carrier of a terminal, where the first secondary carrier is a non-contiguous carrier, and the first carrier configuration information includes a maximum continuous channel occupancy duration and a channel listening duration of the first secondary carrier, and further includes a channel occupancy start reference time point of the first secondary carrier and/or a channel listening start reference time point of the first secondary carrier. The network-side device also includes an information sending module, configured to send the first carrier configuration information determined by the information determining module to the terminal, so that the terminal performs the following operations according to the received first carrier configuration information: determining a special subframe in the first secondary carrier, where the special subframe includes all or some of gap symbols, and the gap symbols are symbols that are completely or partly occupied by the channel listening duration; and using all symbols except the gap symbols in the special subframe as symbols that can be occupied by a PDCCH (Physical Downlink Control Channel) and/or a PDSCH (Physical Downlink Shared Channel), and correspondingly receiving or decoding the PDCCH and/or the PDSCH in the special subframe according to the determined symbols that can be occupied by the PDCCH and/or the PDSCH.

With reference to the first aspect, in a first possible implementation manner of the first aspect, the network-side device further includes a symbol designation module, where the symbol designation module is configured to designate a PDSCH start symbol location for the first secondary carrier before the determined first carrier configuration information is sent to the terminal if it is determined that the first secondary carrier is a cross-scheduled carrier; and the information sending module is specifically configured to send, to the terminal when it is determined that the first secondary carrier is a cross-scheduled carrier, the first carrier configuration information carrying symbol location indication information used to indicate the PDSCH start symbol location, so that after the terminal determines the special subframe in the first secondary carrier according to the first carrier configuration information, the terminal uses, according to the PDSCH start symbol location indicated in the symbol location indication information, each non-gap symbol after the PDSCH start symbol location in the special subframe as a symbol that can be occupied by the PDSCH.

With reference to the first aspect or the first possible implementation manner of the first aspect, in a second possible implementation manner of the first aspect, the network-side device further includes a channel monitoring module, where the channel monitoring module is configured to monitor, after the first carrier configuration information of the first secondary carrier is determined, whether a channel corresponding to the first secondary carrier is occupied by another network-side device in a time period corresponding to the channel listening duration; and the information sending module is further configured to send a carrier release message to the terminal when a monitoring result of the channel monitoring module is yes, so that the terminal stops, according to the carrier release message, a data receiving or decoding operation performed on the first secondary carrier.

With reference to the first aspect, or the first or the second possible implementation manner of the first aspect, in a third possible implementation manner of the first aspect, the information sending module is specifically configured to send the first carrier configuration information determined by the information determining module to the terminal by using any one or more types of the following signaling: an RRC (Radio Resource Control) message, a MAC (Media access control) layer PDU (Protocol Data Unit) message, or physical layer signaling.

With reference to any one of the first aspect, or the first to the third possible implementation manners of the first aspect, in a fourth possible implementation manner of the first aspect, the information sending module is specifically configured to send the channel occupancy start time point and/or the channel listening start time point in the first carrier configuration information to the terminal at any time point after the first secondary carrier begins to occupy the channel; and send the maximum continuous channel occupancy duration and the channel listening duration of the first secondary carrier in the first carrier configuration information to the terminal when the first secondary carrier is configured for the terminal.

With reference to any one of the first aspect, or the first to the fourth possible implementation manners of the first aspect, in a fifth possible implementation manner of the first aspect, the information determining module is further configured to determine second carrier configuration information of the first secondary carrier, where the second carrier configuration information includes any one or more types of the following information: system broadcast information of the first secondary carrier, where the system broadcast information can indicate that the first secondary carrier includes a common channel, where the common channel includes any one or more of a PBCH (Physical broadcast channel), a PSS (Primary synchronization signal), an SSS (Secondary synchronization signal), or a reference signal; first indication information, where the first indication information is used to indicate that the first secondary carrier does not include a common channel; or second indication information, where the second indication information is used to indicate that a common channel used in the first secondary carrier is a common channel in an extended format; and the information sending module is further configured to send the second carrier configuration information determined by the information determining module to the terminal, so that the terminal performs the following operation according to the received second carrier configuration information: determining whether the first secondary carrier includes the common channel, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel; or determining whether the common channel in the extended format is used in the first secondary carrier, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel in the extended format; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel in the extended format.

According to a second aspect, a network-side device is provided. The network-side device includes an information determining module, configured to determine first carrier configuration information of a first carrier of a terminal, where the first carrier configuration information includes any one or more types of the following information: system broadcast information of the first carrier, where the system broadcast information can indicate that the first carrier includes a common channel, where the common channel includes any one or more of a PBCH, a PSS, an SSS, or a reference signal; first indication information, where the first indication information is used to indicate that the first carrier does not include a common channel; or second indication information, where the second indication information is used to indicate that a common channel used in the first carrier is a common channel in an extended format. The network-side device also includes an information sending module, configured to send the first carrier configuration information determined by the information determining module to the terminal, so that the terminal performs the following operation according to the received first carrier configuration information: determining whether the first carrier includes the common channel, and when a determining result is yes, when receiving or decoding a PDCCH and/or a PDSCH in a subframe in the first carrier, excluding, from symbols that can be occupied by the PDCCH and/or the PDSCH in the subframe, symbols occupied by the common channel; or when a determining result is no, when receiving or decoding a PDCCH and/or a PDSCH in a subframe in the first carrier, skipping excluding, from symbols that can be occupied by the PDCCH and/or the PDSCH in the subframe, symbols occupied by the common channel; or determining whether the common channel in the extended format is used in the first carrier, and when a determining result is yes, when receiving or decoding a PDCCH and/or a PDSCH in a subframe in the first carrier, excluding, from symbols that can be occupied by the PDCCH and/or the PDSCH in the subframe, symbols occupied by the common channel in the extended format; or when a determining result is no, when receiving or decoding a PDCCH and/or a PDSCH in a subframe in the first carrier, skipping excluding, from symbols that can be occupied by the PDCCH and/or the PDSCH in the subframe, symbols occupied by the common channel in the extended format.

According to a third aspect, a terminal is provided. The terminal includes an information obtaining module, configured to obtain first carrier configuration information of a first secondary carrier, where the first secondary carrier is a non-contiguous carrier, and the first carrier configuration information includes a maximum continuous channel occupancy duration and a channel listening duration of the first secondary carrier, and further includes a channel occupancy start reference time point and/or a channel listening start reference time point of the first secondary carrier. The terminal also includes a subframe determining module, configured to determine a special subframe in the first secondary carrier according to the first carrier configuration information obtained by the information obtaining module, where the special subframe includes all or some of gap symbols, and the gap symbols are symbols that are completely or partly occupied by the channel listening duration. The terminal also includes a subframe processing module, configured to use all symbols except the gap symbols in the special subframe determined by the subframe determining module as symbols that can be occupied by a PDCCH and/or a PDSCH, and correspondingly receive or decode the PDCCH and/or the PDSCH in the special subframe according to the determined symbols that can be occupied by the PDCCH and/or the PDSCH.

With reference to the third aspect, in a first possible implementation manner of the third aspect, the subframe determining module is specifically configured to determine a channel occupancy end time point or a channel listening start time point of the first secondary carrier according to the maximum continuous channel occupancy duration, the channel listening duration, and the channel occupancy start reference time point and/or the channel listening start reference time point included in the first carrier configuration information, use M symbols after the determined channel occupancy end time point or the determined channel listening start time point as the gap symbols, and use the subframe that includes all or some symbols of the M symbols as the special subframe, where the M symbols are determined according to the channel listening duration, and M is a positive integer that is greater than or equal to 1.

With reference to the third aspect or the first possible implementation manner of the third aspect, in a second possible implementation manner of the third aspect, if ending of channel occupancy of the first secondary carrier is limited to a subframe boundary, the subframe determining module is specifically configured to determine the channel occupancy end time point or the channel listening start time point of the first secondary carrier according to the maximum continuous channel occupancy duration, the channel listening duration, the channel occupancy start reference time point and/or the channel listening start reference time point, and subframe boundary information included in the first carrier configuration information, use the M symbols after the determined channel occupancy end time point or the determined channel listening start time point as the gap symbols, and use the subframe that includes all or some symbols of the M symbols as the special subframe.

With reference to the third aspect, or the first or the second possible implementation manner of the third aspect, in a third possible implementation manner of the third aspect, the subframe processing module is specifically configured to: if it is determined that the first carrier configuration information carries symbol location indication information used to indicate a PDSCH start symbol location, use, according to the PDSCH start symbol location indicated in the symbol location indication information, each non-gap symbol after the PDSCH start symbol location in the special subframe as a symbol that can be occupied by the PDSCH; or specifically configured to read a PCFICH (physical control format indicator channel) from a first symbol of the special subframe, determine, according to the PCFICH, the symbols that can be occupied by the PDCCH, and use all symbols except the gap symbols and the symbols that can be occupied by the PDCCH in the special subframe as the symbols that can be occupied by the PDSCH; or specifically configured to read a PCFICH from an $(M+1)^{th}$ symbol of the special subframe, determine, according to the PCFICH, the symbols that can be occupied by the PDCCH, and use all symbols except the gap symbols and the symbols that can be occupied by the PDCCH in the special subframe as the symbols that can be occupied by the PDSCH.

With reference to any one of the third aspect, or the first to the third possible implementation manners of the third aspect, in a fourth possible implementation manner of the third aspect, the terminal further includes an information monitoring module, where the information monitoring module is configured to: for any gap symbol, perform energy detection on the gap symbol; and/or configured to monitor whether a carrier release message for the first secondary carrier is received from a network-side device; and the subframe processing module is further configured to: for any gap symbol, when it is determined that energy of the gap symbol detected by the information monitoring module is higher than a specified energy threshold, stop receiving or decoding the special subframe that includes all or some symbols of the gap symbols; or when the information monitoring module detects that the carrier release message for the first secondary carrier is received from the network-side device, further configured to stop a data receiving or decoding operation performed on the first secondary carrier.

With reference to any one of the third aspect, or the first to the fourth possible implementation manners of the third aspect, in a fifth possible implementation manner of the third aspect, the first carrier configuration information obtained by the information obtaining module is transmitted to the terminal by the network-side device.

With reference to the fifth possible implementation manner of the third aspect, in a sixth possible implementation manner of the third aspect, the first carrier configuration information obtained by the information obtaining module is transmitted to the terminal by the network-side device by using any one or more types of the following signaling: an RRC message, a MAC layer PDU message, or physical layer signaling.

With reference to the fifth or the sixth possible implementation manner of the third aspect, in a seventh possible implementation manner of the third aspect, the channel occupancy start reference time point and/or the channel listening start reference time point in the first carrier configuration information obtained by the information obtaining module are/is transmitted to the terminal by the network-side device at any time point after the first secondary carrier begins to occupy the channel; and the maximum continuous channel occupancy duration and the channel listening duration of the first secondary carrier in the first carrier configuration information obtained by the information obtaining module are transmitted to the terminal when the network-side device configures the first secondary carrier for the terminal.

With reference to any one of the third aspect, or the first to the seventh possible implementation manners of the third aspect, in an eighth possible implementation manner of the third aspect, the information obtaining module is further configured to receive second carrier configuration information delivered for the first secondary carrier by the network-side device, where the second carrier configuration information includes any one or more types of the following information: system broadcast information of the first secondary carrier, where the system broadcast information can indicate that the first secondary carrier includes a common channel, where the common channel includes any one or more of a PBCH, a PSS, an SSS, or a reference signal; first indication information, where the first indication information is used to indicate that the first secondary carrier does not include a common channel; or second indication information, where the second indication information is used to indicate that a common channel used in the first secondary carrier is a common channel in an extended format; and the subframe processing module is further configured to: determine, according to the second carrier configuration information, whether the first secondary carrier includes the common channel, and when a determining result is yes, when receiving or decoding the PDCCH and/or the PDSCH in the subframe in the first secondary carrier, exclude, from the symbols that can be occupied by the PDCCH and/or the PDSCH in the subframe, symbols occupied by the common channel; or when a determining result is no, when receiving or decoding the PDCCH and/or the PDSCH in the subframe in the first secondary carrier, skip excluding, from the symbols that can be occupied by the PDCCH and/or the PDSCH in the subframe, symbols occupied by the common channel; or further configured to determine, according to the second carrier configuration information, whether the common channel in the extended format is used in the first secondary carrier, and when a determining result is yes, when receiving or decoding the PDCCH and/or the PDSCH in the subframe in the first secondary carrier, exclude, from the symbols that can be occupied by the PDCCH and/or the PDSCH in the subframe, symbols occupied by the common channel in the extended format; or when a determining result is no, when receiving or decoding the PDCCH and/or the PDSCH in the subframe in the first secondary carrier, skip excluding, from the symbols that can be occupied by the PDCCH and/or the PDSCH in the subframe, symbols occupied by the common channel in the extended format.

With reference to the eighth possible implementation manner of the third aspect, in a ninth possible implementation manner of the third aspect, the subframe processing module is specifically configured to: if it is determined that the second carrier configuration information includes the first indication information, or it is determined that the second carrier configuration information does not include the system broadcast information, determine that the first secondary carrier does not include the common channel; or specifically configured to: if it is determined that the second carrier configuration information does not include the first indication information, or it is determined that the second carrier configuration information includes the system broadcast information, determine that the first secondary carrier includes the common channel.

With reference to the eighth or the ninth possible implementation manner of the third aspect, in a tenth possible implementation manner of the third aspect, the subframe processing module is specifically configured to: if it is determined that the second carrier configuration information includes the second indication information, determine that the common channel in the extended format is used in the first secondary carrier; or specifically configured to: if it is determined that the second carrier configuration information does not include the second indication information, determine that a common channel in a non-extended format is used in the first secondary carrier.

According to a fourth aspect, a terminal is provided. The terminal includes: an information receiving module, configured to receive first carrier configuration information delivered for a first carrier by a network-side device, where the first carrier configuration information includes any one or more types of the following information: system broadcast information of the first carrier, where the system broadcast information can indicate that the first carrier includes a common channel, where the common channel includes any one or more of a PBCH, a PSS, an SSS, or a reference signal; first indication information, where the first indication information is used to indicate that the first carrier does not include a common channel; or second indication information, where the second indication information is used to indicate that a common channel used in the first carrier is a common channel in an extended format. The terminal also includes a subframe processing module, configured to determine, according to the first carrier configuration information, whether the first carrier includes the common channel, and when a determining result is yes, when receiving or decoding a PDCCH and/or a PDSCH in a subframe in the first carrier, exclude, from symbols that can be occupied by the PDCCH and/or the PDSCH in the subframe, symbols occupied by the common channel; or when a determining result is no, when receiving or decoding a PDCCH and/or a PDSCH in a subframe in the first carrier, skip excluding, from symbols that can be occupied by the PDCCH and/or the PDSCH in the subframe, symbols occupied by the common channel; or determine, according to the first carrier configuration information, whether the common channel in the extended format is used in the first carrier, and when a determining result is yes, when receiving or decoding a PDCCH and/or a PDSCH in a subframe in the first carrier, exclude, from symbols that can be occupied by the PDCCH and/or the PDSCH in the subframe, symbols occupied by the common channel in the extended format; or when a determining result is no, when receiving or decoding a PDCCH and/or a PDSCH in a subframe in the first carrier, skip excluding, from symbols that can be occupied by the PDCCH and/or the PDSCH in the subframe, symbols occupied by the common channel in the extended format.

With reference to the fourth aspect, in a first possible implementation manner of the fourth aspect, the subframe processing module is specifically configured to: if it is determined that the first carrier configuration information includes the first indication information, or it is determined that the first carrier configuration information does not include the system broadcast information, determine that the first carrier does not include the common channel; or specifically configured to: if it is determined that the first carrier configuration information does not include the first indication information, or it is determined that the first carrier configuration information includes the system broadcast information, determine that the first carrier includes the common channel.

With reference to the fourth aspect or the first possible implementation manner of the fourth aspect, in a second possible implementation manner of the fourth aspect, the subframe processing module is specifically configured to: if it is determined that the first carrier configuration information includes the second indication information, determine that the common channel in the extended format is used in the first carrier; or specifically configured to: if it is determined that the first carrier configuration information does not include the second indication information, determine that a common channel in a non-extended format is used in the first carrier.

According to a fifth aspect, a network-side device is provided. The network-side device includes: a processor, configured to determine first carrier configuration information of a first secondary carrier of a terminal, where the first secondary carrier is a non-contiguous carrier, and the first carrier configuration information includes a maximum continuous channel occupancy duration and a channel listening duration of the first secondary carrier, and further includes a channel occupancy start reference time point of the first secondary carrier and/or a channel listening start reference time point of the first secondary carrier. The network-side device also includes a transmitter, configured to send the first carrier configuration information determined by the processor to the terminal, so that the terminal performs the following operations according to the received first carrier configuration information: determining a special subframe in the first secondary carrier, where the special subframe includes all or some of gap symbols, and the gap symbols are symbols that are completely or partly occupied by the channel listening duration; and using all symbols except the gap symbols in the special subframe as symbols that can be occupied by a PDCCH and/or a PDSCH, and correspondingly receiving or decoding the PDCCH and/or the PDSCH in the special subframe according to the determined symbols that can be occupied by the PDCCH and/or the PDSCH.

With reference to the fifth aspect, in a first possible implementation manner of the fifth aspect, the processor is further configured to designate a PDSCH start symbol location for the first secondary carrier before the determined first carrier configuration information is sent to the terminal if it is determined that the first secondary carrier is a cross-scheduled carrier; and the transmitter is specifically configured to send, to the terminal when it is determined that the first secondary carrier is a cross-scheduled carrier, the first carrier configuration information carrying symbol location indication information used to indicate the PDSCH start symbol location, so that after the terminal determines the special subframe in the first secondary carrier according to the first carrier configuration information, the terminal uses, according to the PDSCH start symbol location indicated in the symbol location indication information, each non-gap symbol after the PDSCH start symbol location in the special subframe as a symbol that can be occupied by the PDSCH.

With reference to the fifth aspect or the first possible implementation manner of the fifth aspect, in a second possible implementation manner of the fifth aspect, the network-side device further includes a monitor, where the monitor is configured to monitor, after the first carrier configuration information of the first secondary carrier is determined, whether a channel corresponding to the first secondary carrier is occupied by another network-side device in a time period corresponding to the channel listening duration; and the transmitter is further configured to send a carrier release message to the terminal when a monitoring result of the monitor is yes, so that the terminal stops, according to the carrier release message, a data receiving or decoding operation performed on the first secondary carrier.

With reference to the fifth aspect, or the first or the second possible implementation manner of the fifth aspect, in a third possible implementation manner of the fifth aspect, the transmitter is specifically configured to send the first carrier configuration information determined by the processor to the terminal by using any one or more types of the following signaling: an RRC message, a MAC layer PDU message, or physical layer signaling.

With reference to any one of the fifth aspect, or the first to the third possible implementation manners of the fifth aspect, in a fourth possible implementation manner of the fifth aspect, the transmitter is specifically configured to send the channel occupancy start time point and/or the channel listening start time point in the first carrier configuration information to the terminal at any time point after the first secondary carrier begins to occupy the channel; and send the maximum continuous channel occupancy duration and the channel listening duration of the first secondary carrier in the first carrier configuration information to the terminal when the first secondary carrier is configured for the terminal.

With reference to any one of the fifth aspect, or the first to the fourth possible implementation manners of the fifth aspect, in a fifth possible implementation manner of the fifth aspect, the processor is further configured to determine second carrier configuration information of the first secondary carrier, where the second carrier configuration information includes any one or more types of the following information: system broadcast information of the first secondary carrier, where the system broadcast information can indicate that the first secondary carrier includes a common channel, where the common channel includes any one or more of a PBCH, a PSS, an SSS, or a reference signal; first indication information, where the first indication information is used to indicate that the first secondary carrier does not include a common channel; or second indication information, where the second indication information is used to indicate that a common channel used in the first secondary carrier is a common channel in an extended format; and the transmitter is further configured to send the second carrier configuration information determined by the processor to the terminal, so that the terminal performs the following operation according to the received second carrier configuration information: determining whether the first secondary carrier includes the common channel, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel; or determining whether the common channel in the extended format is used in the first secondary carrier, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel in the extended format; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel in the extended format.

According to a sixth aspect, a network-side device is provided. The network-side device includes: a processor, configured to determine first carrier configuration information of a first carrier of a terminal, where the first carrier configuration information includes any one or more types of the following information: system broadcast information of the first carrier, where the system broadcast information can indicate that the first carrier includes a common channel, where the common channel includes any one or more of a PBCH, a PSS, an SSS, or a reference signal; first indication information, where the first indication information is used to indicate that the first carrier does not include a common channel; or second indication information, where the second indication information is used to indicate that a common channel used in the first carrier is a common channel in an extended format. The network-side device also includes a transmitter, configured to send the first carrier configuration information determined by the processor to the terminal, so that the terminal performs the following operation according to the received first carrier configuration information: determining whether the first carrier includes the common channel, and when a determining result is yes, when receiving or decoding a PDCCH and/or a PDSCH in a subframe in the first carrier, excluding, from symbols that can be occupied by the PDCCH and/or the PDSCH in the subframe, symbols occupied by the common channel; or when a determining result is no, when receiving or decoding a PDCCH and/or a PDSCH in a subframe in the first carrier, skipping excluding, from symbols that can be occupied by the PDCCH and/or the PDSCH in the subframe, symbols occupied by the common channel; or determining whether the common channel in the extended format is used in the first carrier, and when a determining result is yes, when receiving or decoding a PDCCH and/or a PDSCH in a subframe in the first carrier, excluding, from symbols that can be occupied by the PDCCH and/or the PDSCH in the subframe, symbols occupied by the common channel in the extended format; or when a determining result is no, when receiving or decoding a PDCCH and/or a PDSCH in a subframe in the first carrier, skipping excluding, from symbols that can be occupied by the PDCCH and/or the PDSCH in the subframe, symbols occupied by the common channel in the extended format.

According to a seventh aspect, a terminal is provided. The terminal includes: a receiver, configured to obtain first carrier configuration information of a first secondary carrier, where the first secondary carrier is a non-contiguous carrier, and the first carrier configuration information includes a maximum continuous channel occupancy duration and a channel listening duration of the first secondary carrier, and further includes a channel occupancy start reference time point and/or a channel listening start reference time point of the first secondary carrier. The terminal also includes a processor, configured to determine a special subframe in the first secondary carrier according to the first carrier configuration information obtained by the receiver, where the special subframe includes all or some of gap symbols, and the gap symbols are symbols that are completely or partly occupied by the channel listening duration; and use all symbols except the gap symbols in the determined special subframe as symbols that can be occupied by a PDCCH and/or a PDSCH, and correspondingly receive or decode the PDCCH and/or the PDSCH in the special subframe according to the determined symbols that can be occupied by the PDCCH and/or the PDSCH.

With reference to the seventh aspect, in a first possible implementation manner of the seventh aspect, the processor is specifically configured to determine a channel occupancy end time point or a channel listening start time point of the first secondary carrier according to the maximum continuous channel occupancy duration, the channel listening duration, and the channel occupancy start reference time point and/or the channel listening start reference time point included in the first carrier configuration information, use M symbols after the determined channel occupancy end time point or the determined channel listening start time point as the gap symbols, and use the subframe that includes all or some symbols of the M symbols as the special subframe, where the M symbols are determined according to the channel listening duration, and M is a positive integer that is greater than or equal to 1.

With reference to the seventh aspect or the first possible implementation manner of the seventh aspect, in a second possible implementation manner of the seventh aspect, if ending of channel occupancy of the first secondary carrier is limited to a subframe boundary, the processor is specifically configured to determine the channel occupancy end time point or the channel listening start time point of the first secondary carrier according to the maximum continuous channel occupancy duration, the channel listening duration, the channel occupancy start reference time point and/or the channel listening start reference time point, and subframe boundary information included in the first carrier configuration information, use the M symbols after the determined channel occupancy end time point or the determined channel listening start time point as the gap symbols, and use the subframe that includes all or some symbols of the M symbols as the special subframe.

With reference to the seventh aspect, or the first or the second possible implementation manner of the seventh aspect, in a third possible implementation manner of the seventh aspect, the processor is specifically configured to: if it is determined that the first carrier configuration information carries symbol location indication information used to indicate a PDSCH start symbol location, use, according to the PDSCH start symbol location indicated in the symbol location indication information, each non-gap symbol after the PDSCH start symbol location in the special subframe as a symbol that can be occupied by the PDSCH; or specifically configured to read a physical control format indicator channel PCFICH from a first symbol of the special subframe, determine, according to the PCFICH, the symbols that can be occupied by the PDCCH, and use all symbols except the gap symbols and the symbols that can be occupied by the PDCCH in the special subframe as the symbols that can be occupied by the PDSCH; or specifically configured to read a PCFICH from an $(M+1)^{th}$ symbol of the special subframe, determine, according to the PCFICH, the symbols that can be occupied by the PDCCH, and use all symbols except the gap symbols and the symbols that can be occupied by the PDCCH in the special subframe as the symbols that can be occupied by the PDSCH.

With reference to any one of the seventh aspect, or the first to the third possible implementation manners of the seventh aspect, in a fourth possible implementation manner of the seventh aspect, the terminal further includes a monitor, where the monitor is configured to: for any gap symbol, perform energy detection on the gap symbol; and/or configured to monitor whether a carrier release message for the first secondary carrier is received from a network-side device; and the processor is further configured to: for any gap symbol, when it is determined that energy of the gap symbol detected by the monitor is higher than a specified energy threshold, stop receiving or decoding the special subframe that includes all or some symbols of the gap symbols; or when the monitor detects that the carrier release message for the first secondary carrier is received from the network-side device, further configured to stop a data receiving or decoding operation performed on the first secondary carrier.

With reference to any one of the seventh aspect, or the first to the fourth possible implementation manners of the seventh aspect, in a fifth possible implementation manner of the seventh aspect, the first carrier configuration information obtained by the receiver is transmitted to the terminal by the network-side device.

With reference to the fifth possible implementation manner of the seventh aspect, in a sixth possible implementation manner of the seventh aspect, the first carrier configuration information obtained by the receiver is transmitted to the terminal by the network-side device by using any one or more types of the following signaling: an RRC message, a MAC layer PDU message, or physical layer signaling.

With reference to the fifth or the sixth possible implementation manner of the seventh aspect, in a seventh possible implementation manner of the seventh aspect, the channel occupancy start reference time point and/or the channel listening start reference time point in the first carrier configuration information obtained by the receiver are/is transmitted to the terminal by the network-side device at any time point after the first secondary carrier begins to occupy the channel; and the maximum continuous channel occupancy duration and the channel listening duration of the first secondary carrier in the first carrier configuration information obtained by the receiver are transmitted to the terminal when the network-side device configures the first secondary carrier for the terminal.

With reference to any one of the seventh aspect, or the first to the seventh possible implementation manners of the seventh aspect, in an eighth possible implementation manner of the seventh aspect, the receiver is further configured to receive second carrier configuration information delivered for the first secondary carrier by the network-side device, where the second carrier configuration information includes any one or more types of the following information: system broadcast information of the first secondary carrier, where the system broadcast information can indicate that the first secondary carrier includes a common channel, where the common channel includes any one or more of a PBCH, a PSS, an SSS, or a reference signal; first indication information, where the first indication information is used to indicate that the first secondary carrier does not include a common channel; or second indication information, where the second indication information is used to indicate that a common channel used in the first secondary carrier is a common channel in an extended format; and the processor is further configured to: determine, according to the second carrier configuration information, whether the first secondary carrier includes the common channel, and when a determining result is yes, when receiving or decoding the PDCCH and/or the PDSCH in the subframe in the first secondary carrier, exclude, from the symbols that can be occupied by the PDCCH and/or the PDSCH in the subframe, symbols occupied by the common channel; or when a determining result is no, when receiving or decoding the PDCCH and/or the PDSCH in the subframe in the first secondary carrier, skip excluding, from the symbols that can be occupied by the PDCCH and/or the PDSCH in the subframe, symbols occupied by the common channel; or further configured to determine, according to the second carrier configuration information, whether the common channel in the extended format is used in the first secondary carrier, and when a determining result is yes, when receiving or decoding the PDCCH and/or the PDSCH in the subframe in the first secondary carrier, exclude, from the symbols that can be occupied by the PDCCH and/or the PDSCH in the subframe, symbols occupied by the common channel in the extended format; or when a determining result is no, when receiving or decoding the PDCCH and/or the PDSCH in the subframe in the first secondary carrier, skip excluding, from the symbols that can be occupied by the PDCCH and/or the PDSCH in the subframe, symbols occupied by the common channel in the extended format.

With reference to the eighth possible implementation manner of the seventh aspect, in a ninth possible implementation manner of the seventh aspect, the processor is specifically configured to: if it is determined that the second carrier configuration information includes the first indication information, or it is determined that the second carrier configuration information does not include the system broadcast information, determine that the first secondary carrier does not include the common channel; or specifically configured to: if it is determined that the second carrier configuration information does not include the first indication information, or it is determined that the second carrier configuration information includes the system broadcast information, determine that the first secondary carrier includes the common channel.

With reference to the eighth or the ninth possible implementation manner of the seventh aspect, in a tenth possible implementation manner of the seventh aspect, the processor is specifically configured to: if it is determined that the second carrier configuration information includes the second indication information, determine that the common channel in the extended format is used in the first secondary carrier; or specifically configured to: if it is determined that the second carrier configuration information does not include the second indication information, determine that a common channel in a non-extended format is used in the first secondary carrier.

According to an eighth aspect, a terminal is provided. The terminal includes: a receiver, configured to receive first carrier configuration information delivered for a first carrier by a network-side device, where the first carrier configuration information includes any one or more types of the following information: system broadcast information of the first carrier, where the system broadcast information can indicate that the first carrier includes a common channel, where the common channel includes any one or more of a PBCH, a PSS, an SSS, or a reference signal; first indication information, where the first indication information is used to indicate that the first carrier does not include a common channel; or second indication information, where the second indication information is used to indicate that a common channel used in the first carrier is a common channel in an extended format. The terminal also includes a processor, configured to determine, according to the first carrier configuration information, whether the first carrier includes the common channel, and when a determining result is yes, when receiving or decoding a PDCCH and/or a PDSCH in a subframe in the first carrier, exclude, from symbols that can be occupied by the PDCCH and/or the PDSCH in the subframe, symbols occupied by the common channel; or when a determining result is no, when receiving or decoding a PDCCH and/or a PDSCH in a subframe in the first carrier, skip excluding, from symbols that can be occupied by the PDCCH and/or the PDSCH in the subframe, symbols occupied by the common channel; or determine, according to the first carrier configuration information, whether the common channel in the extended format is used in the first carrier, and when a determining result is yes, when receiving or decoding a PDCCH and/or a PDSCH in a subframe in the first carrier, exclude, from symbols that can be occupied by the PDCCH and/or the PDSCH in the subframe, symbols occupied by the common channel in the extended format; or when a determining result is no, when receiving or decoding a PDCCH and/or a PDSCH in a subframe in the first carrier, skip excluding, from symbols that can be occupied by the PDCCH and/or the PDSCH in the subframe, symbols occupied by the common channel in the extended format.

With reference to the eighth aspect, in a first possible implementation manner of the eighth aspect, the processor is specifically configured to: if it is determined that the first carrier configuration information includes the first indication information, or it is determined that the first carrier configuration information does not include the system broadcast information, determine that the first carrier does not include the common channel; or specifically configured to: if it is determined that the first carrier configuration information does not include the first indication information, or it is determined that the first carrier configuration information includes the system broadcast information, determine that the first carrier includes the common channel.

With reference to the eighth aspect or the first possible implementation manner of the eighth aspect, in a second possible implementation manner of the eighth aspect, the processor is specifically configured to: if it is determined that the first carrier configuration information includes the second indication information, determine that the common channel in the extended format is used in the first carrier; or specifically configured to: if it is determined that the first carrier configuration information does not include the second indication information, determine that a common channel in a non-extended format is used in the first carrier.

According to a ninth aspect, a subframe processing method is provided. The method includes: determining, by a network-side device, first carrier configuration information of a first secondary carrier of a terminal, where the first secondary carrier is a non-contiguous carrier, and the first carrier configuration information includes a maximum continuous channel occupancy duration and a channel listening duration of the first secondary carrier, and further includes a channel occupancy start reference time point of the first secondary carrier and/or a channel listening start reference time point of the first secondary carrier. The method also includes transmitting the determined first carrier configuration information to the terminal, so that the terminal performs the following operations according to the received first carrier configuration information: determining a special subframe in the first secondary carrier, where the special subframe includes all or some of gap symbols, and the gap symbols are symbols that are completely or partly occupied by the channel listening duration; and using all symbols except the gap symbols in the special subframe as symbols that can be occupied by a PDCCH and/or a PDSCH, and correspondingly receiving or decoding the PDCCH and/or the PDSCH in the special subframe according to the determined symbols that can be occupied by the PDCCH and/or the PDSCH.

With reference to the ninth aspect, in a first possible implementation manner of the ninth aspect, before the transmitting the determined first carrier configuration information to the terminal, the method further includes: if it is determined that the first secondary carrier is a cross-scheduled carrier, designating a PDSCH start symbol location for the first secondary carrier; and the transmitting the determined first carrier configuration information to the terminal includes: when it is determined that the first secondary carrier is a cross-scheduled carrier, transmitting, to the terminal, the first carrier configuration information carrying symbol location indication information used to indicate the PDSCH start symbol location, so that after the terminal determines the special subframe in the first secondary carrier according to the first carrier configuration information, the terminal uses, according to the PDSCH start symbol location indicated in the symbol location indication information, each non-gap symbol after the PDSCH start symbol location in the special subframe as a symbol that can be occupied by the PDSCH.

With reference to the ninth aspect or the first possible implementation manner of the ninth aspect, in a second possible implementation manner of the ninth aspect, after the determining first carrier configuration information of a first secondary carrier, the method further includes: monitoring whether a channel corresponding to the first secondary carrier is occupied by another network-side device in a time period corresponding to the channel listening duration; and if a monitoring result is yes, transmitting a carrier release message to the terminal, so that the terminal stops, according to the carrier release message, a data receiving or decoding operation performed on the first secondary carrier.

With reference to the ninth aspect, or the first or the second possible implementation manner of the ninth aspect, in a third possible implementation manner of the ninth aspect, the transmitting the determined first carrier configuration information to the terminal includes: transmitting the determined first carrier configuration information to the terminal by using any one or more types of the following signaling: an RRC message, a MAC layer PDU message, or physical layer signaling.

With reference to any one of the ninth aspect, or the first to the third possible implementation manners of the ninth aspect, in a fourth possible implementation manner of the ninth aspect, the transmitting the determined first carrier configuration information to the terminal includes: transmitting the channel occupancy start time point and/or the channel listening start time point in the first carrier configuration information to the terminal at any time point after the first secondary carrier begins to occupy the channel; and when configuring the first secondary carrier for the terminal, transmitting the maximum continuous channel occupancy duration and the channel listening duration of the first secondary carrier in the first carrier configuration information to the terminal.

With reference to any one of the ninth aspect, or the first to the fourth possible implementation manners of the ninth aspect, in a fifth possible implementation manner of the ninth aspect, the method further includes: determining second carrier configuration information of the first secondary carrier, where the second carrier configuration information includes any one or more types of the following information: system broadcast information of the first secondary carrier, where the system broadcast information can indicate that the first secondary carrier includes a common channel, where the common channel includes any one or more of a PBCH, a PSS, an SSS, or a reference signal; first indication information, where the first indication information is used to indicate that the first secondary carrier does not include a common channel; or second indication information, where the second indication information is used to indicate that a common channel used in the first secondary carrier is a common channel in an extended format; and transmitting the determined second carrier configuration information to the terminal, so that the terminal performs the following operation according to the received second carrier configuration information: determining whether the first secondary carrier includes the common channel, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel; or determining whether the common channel in the extended format is used in the first secondary carrier, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel in the extended format; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel in the extended format.

According to a tenth aspect, a subframe processing method is provided. The method includes: determining, by a network-side device, first carrier configuration information of a first carrier of a terminal, where the first carrier configuration information includes any one or more types of the following information: system broadcast information of the first carrier, where the system broadcast information can indicate that the first carrier includes a common channel, where the common channel includes any one or more of a PBCH, a PSS, an SSS, or a reference signal; first indication information, where the first indication information is used to indicate that the first carrier does not include a common channel; or second indication information, where the second indication information is used to indicate that a common channel used in the first carrier is a common channel in an extended format. The method also includes transmitting the determined first carrier configuration information to the terminal, so that the terminal performs the following operation according to the received first carrier configuration information: determining whether the first carrier includes the common channel, and when a determining result is yes, when receiving or decoding a PDCCH and/or a PDSCH in a subframe in the first carrier, excluding, from symbols that can be occupied by the PDCCH and/or the PDSCH in the subframe, symbols occupied by the common channel; or when a determining result is no, when receiving or decoding a PDCCH and/or a PDSCH in a subframe in the first carrier, skipping excluding, from symbols that can be occupied by the PDCCH and/or the PDSCH in the subframe, symbols occupied by the common channel; or determining whether the common channel in the extended format is used in the first carrier, and when a determining result is yes, when receiving or decoding a PDCCH and/or a PDSCH in a subframe in the first carrier, excluding, from symbols that can be occupied by the PDCCH and/or the PDSCH in the subframe, symbols occupied by the common channel in the extended format; or when a determining result is no, when receiving or decoding a PDCCH and/or a PDSCH in a subframe in the first carrier, skipping excluding, from symbols that can be occupied by the PDCCH and/or the PDSCH in the subframe, symbols occupied by the common channel in the extended format.

According to an eleventh aspect, a subframe processing method is provided. The method includes: obtaining, by a terminal, first carrier configuration information of a first secondary carrier, where the first secondary carrier is a non-contiguous carrier, and the first carrier configuration information includes a maximum continuous channel occupancy duration and a channel listening duration of the first secondary carrier, and further includes a channel occupancy start reference time point and/or a channel listening start reference time point of the first secondary carrier. The method also includes determining a special subframe in the first secondary carrier according to the obtained first carrier configuration information, where the special subframe includes all or some of gap symbols, and the gap symbols are symbols that are completely or partly occupied by the channel listening duration. The method also includes using all symbols except the gap symbols in the special subframe as symbols that can be occupied by a PDCCH and/or a PDSCH, and correspondingly receiving or decoding the PDCCH and/or the PDSCH in the special subframe according to the determined symbols that can be occupied by the PDCCH and/or the PDSCH.

With reference to the eleventh aspect, in a first possible implementation manner of the eleventh aspect, the determining a special subframe in the first secondary carrier according to the obtained first carrier configuration information includes: determining a channel occupancy end time point or a channel listening start time point of the first secondary carrier according to the maximum continuous channel occupancy duration, the channel listening duration, and the channel occupancy start reference time point and/or the channel listening start reference time point included in the first carrier configuration information, using M symbols after the determined channel occupancy end time point or the determined channel listening start time point as the gap symbols, and using the subframe that includes all or some symbols of the M symbols as the special subframe, where the M symbols are determined according to the channel listening duration, and M is a positive integer that is greater than or equal to 1.

With reference to the eleventh aspect or the first possible implementation manner of the eleventh aspect, in a second possible implementation manner of the eleventh aspect, if ending of channel occupancy of the first secondary carrier is limited to a subframe boundary, the determining a special subframe in the non-contiguous secondary carrier according to the obtained first carrier configuration information includes: determining the channel occupancy end time point or the channel listening start time point of the first secondary carrier according to the maximum continuous channel occupancy duration, the channel listening duration, the channel occupancy start reference time point and/or the channel listening start reference time point, and subframe boundary information included in the first carrier configuration information, using the M symbols after the determined channel occupancy end time point or the determined channel listening start time point as the gap symbols, and using the subframe that includes all or some symbols of the M symbols as the special subframe.

With reference to the eleventh aspect, or the first or the second possible implementation manner of the eleventh aspect, in a third possible implementation manner of the eleventh aspect, the using all symbols except the gap symbols in the special subframe as symbols that can be occupied by a PDCCH and/or a PDSCH includes: if it is determined that the first carrier configuration information carries symbol location indication information used to indicate a PDSCH start symbol location, using, according to the PDSCH start symbol location indicated in the symbol location indication information, each non-gap symbol after the PDSCH start symbol location in the special subframe as a symbol that can be occupied by the PDSCH; or reading a PCFICH from a first symbol of the special subframe, determining, according to the PCFICH, the symbols that can be occupied by the PDCCH, and using all symbols except the gap symbols and the symbols that can be occupied by the PDCCH in the special subframe as the symbols that can be occupied by the PDSCH; or reading a PCFICH from an $(M+1)^{th}$ symbol of the special subframe, determining, according to the PCFICH, the symbols that can be occupied by the PDCCH, and using all symbols except the gap symbols and the symbols that can be occupied by the PDCCH in the special subframe as the symbols that can be occupied by the PDSCH.

With reference to any one of the eleventh aspect, or the first to the third possible implementation manners of the eleventh aspect, in a fourth possible implementation manner of the eleventh aspect, the method further includes: for any gap symbol, performing energy detection on the gap symbol, and when determining that detected energy is higher than a specified energy threshold, stopping receiving or decoding the special subframe that includes all or some symbols of the gap symbols; and/or monitoring whether a carrier release message for the first secondary carrier is received from a network-side device, and if yes, stopping a data receiving or decoding operation performed on the first secondary carrier.

With reference to any one of the eleventh aspect, or the first to the fourth possible implementation manners of the eleventh aspect, in a fifth possible implementation manner of the eleventh aspect, the first carrier configuration information is sent to the terminal by the network-side device.

With reference to the fifth possible implementation manner of the eleventh aspect, in a sixth possible implementation manner of the eleventh aspect, the first carrier configuration information is sent to the terminal by the network-side device by using any one or more types of the following signaling: an RRC message, a MAC layer PDU message, or physical layer signaling.

With reference to the fifth or the sixth possible implementation manner of the eleventh aspect, in a seventh possible implementation manner of the eleventh aspect, the channel occupancy start reference time point and/or the channel listening start reference time point in the first carrier configuration information are/is transmitted to the terminal by the network-side device at any time point after the first secondary carrier begins to occupy the channel; and the maximum continuous channel occupancy duration and the channel listening duration of the first secondary carrier in the first carrier configuration information are transmitted to the terminal when the network-side device configures the first secondary carrier for the terminal.

With reference to any one of the eleventh aspect, or the first to the seventh possible implementation manners of the eleventh aspect, in an eighth possible implementation manner of the eleventh aspect, the method further includes: receiving second carrier configuration information delivered for the first secondary carrier by the network-side device, where the second carrier configuration information includes any one or more types of the following information: system broadcast information of the first secondary carrier, where the system broadcast information can indicate that the first secondary carrier includes a common channel, where the common channel includes any one or more of a PBCH, a PSS, an SSS, or a reference signal; first indication information, where the first indication information is used to indicate that the first secondary carrier does not include a common channel; or second indication information, where the second indication information is used to indicate that a common channel used in the first secondary carrier is a common channel in an extended format; and determining, according to the second carrier configuration information, whether the first secondary carrier includes the common channel, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel; or determining, according to the second carrier configuration information, whether the common channel in the extended format is used in the first secondary carrier, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel in the extended format; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel in the extended format.

With reference to the eighth possible implementation manner of the eleventh aspect, in a ninth possible implementation manner of the eleventh aspect, the determining, according to the second carrier configuration information, whether the first secondary carrier includes the common channel, includes: if it is determined that the second carrier configuration information includes the first indication information, or it is determined that the second carrier configuration information does not include the system broadcast information, determining that the first secondary carrier does not include the common channel; or if it is determined that the second carrier configuration information does not include the first indication information, or it is determined that the second carrier configuration information includes the system broadcast information, determining that the first secondary carrier includes the common channel.

With reference to the eighth or the ninth possible implementation manner of the eleventh aspect, in a tenth possible implementation manner of the eleventh aspect, the determining, according to the second carrier configuration information, whether the common channel in the extended format is used in the first secondary carrier, includes: if it is determined that the second carrier configuration information includes the second indication information, determining that the common channel in the extended format is used in the first secondary carrier; or if it is determined that the second carrier configuration information does not include the second indication information, determining that a common channel in a non-extended format is used in the first secondary carrier.

According to a twelfth aspect, a subframe processing method is provided. The method includes: receiving, by a terminal, first carrier configuration information delivered for a first carrier by a network-side device, where the first carrier configuration information includes any one or more types of the following information: system broadcast information of the first carrier, where the system broadcast information can indicate that the first carrier includes a common channel, where the common channel includes any one or more of a PBCH, a PSS, an SSS, or a reference signal; first indication information, where the first indication information is used to indicate that the first carrier does not include a common channel; or second indication information, where the second indication information is used to indicate that a common channel used in the first carrier is a common channel in an extended format. The method also includes determining, according to the first carrier configuration information, whether the first carrier includes the common channel, and when a determining result is yes, when receiving or decoding a PDCCH and/or a PDSCH in a subframe in the first carrier, excluding, from symbols that can be occupied by the PDCCH and/or the PDSCH in the subframe, symbols occupied by the common channel; or when a determining result is no, when receiving or decoding a PDCCH and/or a PDSCH in a subframe in the first carrier, skipping excluding, from symbols that can be occupied by the PDCCH and/or the PDSCH in the subframe, symbols occupied by the common channel; or determining, according to the first carrier configuration information, whether the common channel in the extended format is used in the first carrier, and when a determining result is yes, when receiving or decoding a PDCCH and/or a PDSCH in a subframe in the first carrier, excluding, from symbols that can be occupied by the PDCCH and/or the PDSCH in the subframe, symbols occupied by the common channel in the extended format; or when a determining result is no, when receiving or decoding a PDCCH and/or a PDSCH in a subframe in the first carrier, skipping excluding, from symbols that can be occupied by the PDCCH and/or the PDSCH in the subframe, symbols occupied by the common channel in the extended format.

With reference to the twelfth aspect, in a first possible implementation manner of the twelfth aspect, the determining, according to the first carrier configuration information, whether the first carrier includes the common channel, includes: if it is determined that the first carrier configuration information includes the first indication information, or it is determined that the first carrier configuration information does not include the system broadcast information, determining that the first carrier does not include the common channel; or if it is determined that the first carrier configuration information does not include the first indication information, or it is determined that the first carrier configuration information includes the system broadcast information, determining that the first carrier includes the common channel.

With reference to the twelfth aspect or the first possible implementation manner of the twelfth aspect, in a second possible implementation manner of the twelfth aspect, the determining, according to the first carrier configuration information, whether the common channel in the extended format is used in the first carrier, includes: if it is determined that the first carrier configuration information includes the second indication information, determining that the common channel in the extended format is used in the first carrier; or if it is determined that the first carrier configuration information does not include the second indication information, determining that a common channel in a non-extended format is used in the first carrier.

In the technical solutions of the embodiments of the present invention, for any non-contiguous secondary carrier, a terminal can determine a special subframe in the non-contiguous secondary carrier according to a maximum continuous channel occupancy duration and a channel listening duration of the non-contiguous secondary carrier, and a channel occupancy start reference time point and/or a channel listening start reference time point of the non-contiguous secondary carrier that are obtained, where the special subframe includes all or some of gap symbols occupied by the channel listening duration, and for any special subframe, use all symbols except the gap symbols in the special subframe as symbols that can be occupied by a PDCCH and/or a PDSCH, and correspondingly receive or decode the PDCCH and/or the PDSCH in the special subframe according to the symbols that can be occupied by the PDCCH and/or the PDSCH. In this way, a currently existing problem that resource utilization is low because a gap symbol caused by a CCA cannot be excluded from an entire subframe is resolved, and channel utilization is improved if a channel is discontinuously occupied.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
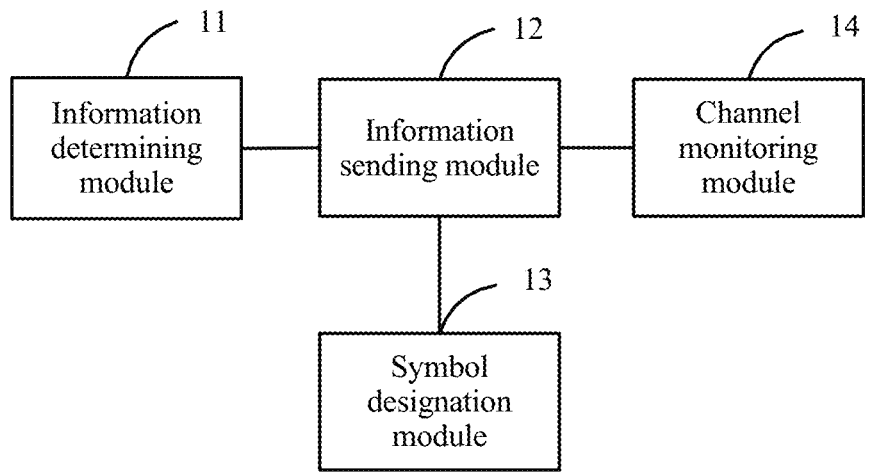
FIG. 1 shows a schematic structural diagram of the network-side device according to Embodiment 1 of the present invention.

Embodiment 1 of the present invention provides a network-side device, and the network-side device may be a device such as a base station, which is not limited in this embodiment of the present invention. Specifically, as shown in FIG. 1, FIG. 1 is a schematic structural diagram of the network-side device in Embodiment 1 of the present invention. The network-side device may include an information determining module 11 and an information sending module 12.

The information determining module 11 may be configured to determine first carrier configuration information of a first secondary carrier of a terminal, where the first secondary carrier is a non-contiguous carrier, and the first carrier configuration information includes a maximum continuous channel occupancy duration and a channel listening duration of the first secondary carrier, and further includes a channel occupancy start reference time point of the first secondary carrier and/or a channel listening start reference time point of the first secondary carrier.

Specifically, in this embodiment of the present invention, the first secondary carrier may generally refer to any non-contiguous secondary carrier in at least one non-contiguous secondary carrier configured for the terminal by the network-side device such as the base station. In addition, the first secondary carrier may be a carrier in an unlicensed spectrum, an asymmetric carrier, or a single downlink carrier, or the like. Details are not described in this embodiment of the present invention.

Further, when the network-side device such as the base station sends a non-contiguous secondary carrier, generally, a maximum continuous channel occupancy duration may not be greater than a specified first duration threshold (such as 13 ms). Therefore, the determined maximum continuous channel occupancy duration of the first secondary carrier may also not be greater than any numeric value of the specified first duration threshold. In addition, to match a radio frame structure of an LTE system, the maximum continuous channel occupancy duration of the first secondary carrier may be generally a non-zero integer multiple of a duration (1 ms) occupied by a subframe, for example, a duration (10 ms) occupied by a radio frame; or may be a non-zero integer multiple of a duration occupied by a symbol in a subframe, namely, an OFDM (Orthogonal Frequency Division Multiplexing) symbol, or the like, which is not limited in this embodiment of the present invention.

Further, it should be noted that, when the network-side device such as the base station sends a non-contiguous secondary carrier, generally, a channel listening duration required for performing channel listening every time may not be less than a specified second threshold (such as 20 s). Therefore, in the solution of the embodiment of the present invention, the determined channel listening duration of the first secondary carrier generally may also not be less than the specified second duration threshold (such as 20 s). Certainly, it should be noted that, generally, the channel listening duration of the first secondary carrier is also not greater than a specified third duration threshold, such as a duration occupied by a subframe, which is not limited in this embodiment of the present invention.

Further, it should be noted that, in this embodiment of the present invention, the determined channel occupancy start reference time point of the first secondary carrier may generally refer to a channel occupancy start point when the first secondary carrier occupies a channel at any time, and the determined channel listening start reference time point of the first secondary carrier may generally refer to a channel listening start time point at any time of channel listening after the first secondary carriers begins to occupy the channel, which is not limited in this embodiment of the present invention.

In addition, it should be noted that, because a time when the terminal begins to receive the first secondary carrier is not fixed, that is, the terminal may begin to receive the first secondary carrier at a time point when the first secondary carrier begins to occupy a channel, or may begin to receive the first secondary carrier only after a time point when the first secondary carrier occupies a channel at an $N^{th}$ time (N is any natural number), preferably, the channel occupancy start reference time point in the first carrier configuration information may be a channel occupancy start time point corresponding to a time point when the terminal begins to receive the first secondary carrier or a channel occupancy start time point corresponding to a certain channel occupancy time after the time point, and the channel listening start reference time point in the first carrier configuration information may be a channel listening start time point corresponding to a time point when the terminal begins to receive the first secondary carrier or a channel listening start time point corresponding to a certain channel listening time after the time point.

In addition, it should be noted that, in this embodiment of the present invention, the first carrier configuration information may include one or more channel occupancy start reference time points, and may include one or more channel listening start reference time points, which is not limited in this embodiment of the present invention.

The information sending module 12 may be configured to send the first carrier configuration information determined by the information determining module 11 to the terminal, so that the terminal performs the following operations according to the received first carrier configuration information: determining a special subframe in the first secondary carrier, where the special subframe includes all or some of gap symbols, and the gap symbols are symbols that are completely or partly occupied by the channel listening duration; and using all symbols except the gap symbols in the special subframe as symbols that can be occupied by a PDCCH and/or a PDSCH, and correspondingly receiving or decoding the PDCCH and/or the PDSCH in the special subframe according to the determined symbols that can be occupied by the PDCCH and/or the PDSCH.

Specifically, the information sending module 12 may be specifically configured to send the first carrier configuration information determined by the information determining module 11 to the terminal by using any one or more types of the following signaling: an RRC message, a MAC layer PDU message, or physical layer signaling, or the like.

Further, it should be noted that, the information sending module 12 may be specifically configured to send any two pieces of information included in the first carrier configuration information to the terminal by using same or different messages. For example, the RRC message may be used to transmit the maximum continuous channel occupancy duration or the channel listening duration of the first secondary carrier to the terminal, and the MAC layer PDU message or the physical layer signaling may be used to transmit the channel occupancy start reference time point or the channel listening start reference time point or the like of the first secondary carrier to the terminal.

In addition, it should be noted that, the information sending module 12 may transmit any two pieces of information included in the first carrier configuration information to the terminal at a same time point or different time points. For example, the channel occupancy start time point and/or the channel listening start time point in the first carrier configuration information may be transmitted to the terminal at any time point after the first secondary carrier begins to occupy the channel; and the maximum continuous channel occupancy duration and the channel listening duration of the first secondary carrier in the first carrier configuration information may be transmitted to the terminal when the first secondary carrier is configured for the terminal.

Further, the network-side device may further include a symbol designation module 13.

The symbol designation module 13 may be configured to designate a PDSCH start symbol location for the first secondary carrier before the determined first carrier configuration information is sent to the terminal if it is determined that the first secondary carrier is a cross-scheduled carrier. Specifically, for any carrier, when a PDSCH of the carrier is scheduled by a PDCCH of another carrier, the scheduling is referred to as cross-carrier scheduling, and correspondingly, the carrier may be referred to as a cross-scheduled carrier. For example, for a primary carrier F1 and a secondary carrier F2, if a PDSCH of the secondary carrier F2 is configured to be scheduled by a PDCCH of the primary carrier F1, the secondary carrier F2 is a corresponding cross-scheduled carrier. In this case, the terminal does not need to read a PDCCH in the secondary carrier F2. In addition, the network-side device may directly configure a PDSCH start symbol location of each subframe in the secondary carrier F2, so that the terminal may directly read the corresponding PDSCH according to the PDSCH start symbol location and PDCCH scheduling information of the primary carrier F1. That is, the PDSCH start symbol location may be used to designate a start location of PDSCH symbols in each subframe in the first secondary carrier used as a cross-scheduled carrier. If the PDSCH start symbol location is 0, it may indicate that all symbols in any subframe in the first secondary carrier used as the cross-scheduled carrier may be used for PDSCH transmission.

Correspondingly, the information sending module 12 may be specifically configured to send, to the terminal when it is determined that the first secondary carrier is a cross-scheduled carrier, the first carrier configuration information carrying symbol location indication information used to indicate the PDSCH start symbol location, so that after the terminal determines the special subframe in the first secondary carrier according to the first carrier configuration information, the terminal uses, according to the PDSCH start symbol location indicated in the symbol location indication information, each non-gap symbol after the PDSCH start symbol location in the special subframe as a symbol that can be occupied by the PDSCH.

Further, the network-side device may further include a channel monitoring module 14.

The channel monitoring module 14 may be configured to monitor, after the first carrier configuration information of the first secondary carrier is determined, whether a channel corresponding to the first secondary carrier is occupied by another network-side device in a time period corresponding to the channel listening duration; and specifically, may determine, by monitoring whether signal energy in the time period corresponding to the channel listening duration is greater than a specified energy threshold, whether the channel corresponding to the first secondary carrier is occupied by the another network-side device; for example, if it is detected that signal energy in the time period corresponding to the channel listening duration is greater than the specified energy threshold, may determine that the channel corresponding to the first secondary carrier is occupied by the another network-side device, which is not further described in this embodiment of the present invention.

Correspondingly, the information sending module 12 may be further configured to send a carrier release message to the terminal when a monitoring result of the channel monitoring module 14 is yes (that is, when the channel monitoring module 14 detects that the channel corresponding to the first secondary carrier is occupied by the another network-side device in the time period corresponding to the channel listening duration), so that the terminal stops, according to the carrier release message, a data receiving or decoding operation performed on the first secondary carrier.

Further, in this embodiment of the present invention, the information determining module 11 may be further configured to determine second carrier configuration information of the first secondary carrier, where the second carrier configuration information may include any one or more types of the following information: system broadcast information of the first secondary carrier, where the system broadcast information can indicate that the first secondary carrier includes a common channel, where the common channel includes any one or more of a PBCH, a PSS, an SSS, or a reference signal (such as a CRS (Common Reference Signal, common pilot), or a CSI-RS (Channel State Information Reference Signal); first indication information, where the first indication information is used to indicate that the first secondary carrier does not include a common channel; or second indication information, where the second indication information is used to indicate that a common channel used in the first secondary carrier is a common channel in an extended format, where the common channel in the extended format indicates that a symbol or a frequency location in which the common channel is located is different from a symbol or a frequency location in which a common channel in a non-extended format in the prior art is located. Specifically, the common channel in the extended format may occupy fewer radio resources, so that the first secondary carrier has more symbol locations that may be used for data transmission. Specifically, for example, in the prior art, a PSS/SSS in a non-extended format occupies last two symbols of timeslots 0 and 10, but a PSS/SSS in an extended format may occupy only a first symbol of the timeslot 0. In this way, three more symbols are available for data transmission in the two timeslots 0 and 10.

Correspondingly, the information sending module 12 may be further configured to send the second carrier configuration information determined by the information determining module 11 to the terminal, so that the terminal performs the following operation according to the received second carrier configuration information: determining whether the first secondary carrier includes the common channel, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel; or determining whether the common channel in the extended format is used in the first secondary carrier, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel in the extended format; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel in the extended format.

Embodiment 1 of the present invention provides a network-side device. In the technical solution of Embodiment 1 of the present invention, for any non-contiguous secondary carrier configured for a terminal, the network-side device may determine carrier configuration information such as a maximum continuous channel occupancy duration and a channel listening duration of the non-contiguous secondary carrier, and a channel occupancy start reference time point and/or a channel listening start reference time point of the non-contiguous secondary carrier, and send the determined carrier configuration information to the terminal, so that the terminal determines a special subframe in the non-contiguous secondary carrier according to the received carrier configuration information, and uses all symbols except gap symbols in the special subframe as symbols that can be occupied by a PDCCH and/or a PDSCH, and correspondingly receives or decodes the PDCCH and/or the PDSCH in the special subframe according to the determined symbols that can be occupied by the PDCCH and/or the PDSCH. In this way, a currently existing problem that resource utilization is low because a gap symbol caused by a CCA cannot be excluded from an entire subframe by a terminal is resolved, and channel utilization is improved if a channel is discontinuously occupied.

In addition, for any carrier configured for a terminal, the network-side device may transmit, to the terminal, indication information about whether a common channel is included in the carrier, so that when the terminal receives or decodes a PDCCH and/or a PDSCH in a subframe in the carrier, the terminal may flexibly select to exclude or skip excluding, according to the received indication information about whether the common channel is included, symbols occupied by the common channel. In this way, a currently existing problem that a throughput is increased because a terminal still excludes, according to a specific location occupied by a common channel, symbols occupied by the common channel in a secondary carrier in which no corresponding common channel is configured, is resolved, and on a basis of improving flexibility of excluding, by the terminal, the symbols occupied by the common channel, an effect of reducing a throughput loss and improving efficiency of receiving or decoding the PDCCH and/or PDSCH by the terminal is achieved.

Embodiment 2

Figure 2:
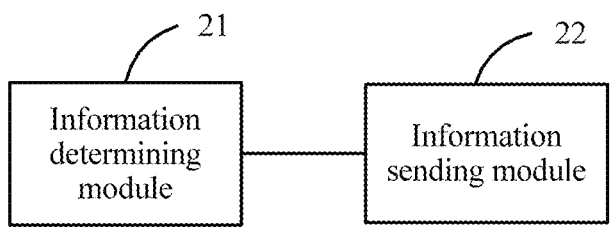
FIG. 2 shows a schematic structural diagram of the network-side device according to Embodiment 2 of the present invention.

Embodiment 2 of the present invention provides a network-side device, where the network-side device may be a device such as a base station, which is not limited in this embodiment of the present invention. Specifically, as shown in FIG. 2, FIG. 2 is a schematic structural diagram of the network-side device in Embodiment 2 of the present invention. The network-side device may include an information determining module 21 and an information sending module 22.

The information determining module 21 may be configured to determine first carrier configuration information of a first carrier of a terminal, where the first carrier configuration information includes any one or more types of the following information: system broadcast information of the first carrier, where the system broadcast information can indicate that the first carrier includes a common channel, where the common channel includes any one or more of a PBCH, a PSS, an SSS, or a reference signal; first indication information, where the first indication information is used to indicate that the first carrier does not include a common channel; or second indication information, where the second indication information is used to indicate that a common channel used in the first carrier is a common channel in an extended format.

The information sending module 22 may be configured to send the first carrier configuration information determined by the information determining module 21 to the terminal, so that the terminal performs the following operation according to the received first carrier configuration information: determining whether the first carrier includes the common channel, and when a determining result is yes, when receiving or decoding a PDCCH and/or a PDSCH in a subframe in the first carrier, excluding, from symbols that can be occupied by the PDCCH and/or the PDSCH in the subframe, symbols occupied by the common channel; or when a determining result is no, when receiving or decoding a PDCCH and/or a PDSCH in a subframe in the first carrier, skipping excluding, from symbols that can be occupied by the PDCCH and/or the PDSCH in the subframe, symbols occupied by the common channel; or determining whether the common channel in the extended format is used in the first carrier, and when a determining result is yes, when receiving or decoding a PDCCH and/or a PDSCH in a subframe in the first carrier, excluding, from symbols that can be occupied by the PDCCH and/or the PDSCH in the subframe, symbols occupied by the common channel in the extended format; or when a determining result is no, when receiving or decoding a PDCCH and/or a PDSCH in a subframe in the first carrier, skipping excluding, from symbols that can be occupied by the PDCCH and/or the PDSCH in the subframe, symbols occupied by the common channel in the extended format.

Specifically, the information determining module 21 may determine the first carrier configuration information of the first carrier when the network-side device configures the corresponding first carrier for the terminal, or may determine the first carrier configuration information of the first carrier after the network-side device configures the corresponding first carrier for the terminal, which is not limited in this embodiment of the present invention. Further, the first carrier may be any non-contiguous carrier or any contiguous carrier configured by the network-side device for the terminal, which is also not limited in this embodiment of the present invention.

That is, in the technical solution of Embodiment 2 of the present invention, for any carrier configured for a terminal, the network-side device may transmit, to the terminal, indication information about whether a common channel is included in the carrier, so that when the terminal receives or decodes a PDCCH and/or a PDSCH in a subframe in the carrier, the terminal may flexibly select to exclude or skip excluding, according to the received indication information about whether the common channel is included, symbols occupied by the common channel. In this way, a currently existing problem that a throughput is increased because a terminal still excludes, according to a specific location occupied by a common channel, symbols occupied by the common channel in a secondary carrier in which no corresponding common channel is configured, is resolved, and on a basis of improving flexibility of excluding, by the terminal, the symbols occupied by the common channel, an effect of reducing a throughput loss and improving efficiency of receiving or decoding the PDCCH and/or PDSCH by the terminal is achieved.

Embodiment 3

Figure 3:
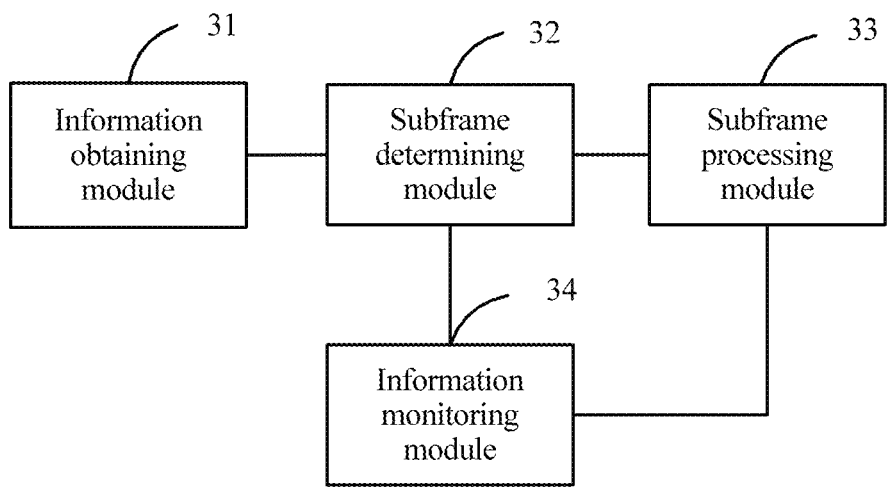
FIG. 3 shows a schematic structural diagram of the terminal according to Embodiment 3 of the present invention.

Embodiment 3 of the present invention provides a terminal, where the terminal may be a device such as a mobile phone that can perform communication and interaction with a network-side device, which is not limited in this embodiment of the present invention. Specifically, as shown in FIG. 3, FIG. 3 is a schematic structural diagram of the terminal in Embodiment 3 of the present invention. The terminal may specifically include an information obtaining module 31, a subframe determining module 32, and a subframe processing module 33.

The information obtaining module 31 may be configured to obtain first carrier configuration information of a first secondary carrier, where the first secondary carrier is a non-contiguous carrier, and the first carrier configuration information includes a maximum continuous channel occupancy duration and a channel listening duration of the first secondary carrier, and further includes a channel occupancy start reference time point and/or a channel listening start reference time point of the first secondary carrier.

The subframe determining module 32 may be configured to determine a special subframe in the first secondary carrier according to the first carrier configuration information obtained by the information obtaining module 31, where the special subframe includes all or some of gap symbols, and the gap symbols are symbols that are completely or partly occupied by the channel listening duration.

The subframe processing module 33 may be configured to use all symbols except the gap symbols in the special subframe determined by the subframe determining module 32 as symbols that can be occupied by a PDCCH and/or a PDSCH, and correspondingly receive or decode the PDCCH and/or the PDSCH in the special subframe according to the determined symbols that can be occupied by the PDCCH and/or the PDSCH.

Specifically, the first carrier configuration information may be generally configured and sent by a network-side device such as a base station to the terminal. Certainly, it should be noted that, the first carrier configuration information may also be predefined according to a specified rule and stored in the terminal, which is not limited in this embodiment of the present invention.

Further, when the first carrier configuration information is sent to the terminal by the network-side device, the first carrier configuration information may be transmitted to the terminal by the network-side device by using any one or more types of the following signaling: an RRC message, a MAC layer PDU message, or physical layer signaling, or the like. In addition, any two pieces of information included in the first carrier configuration information may be transmitted to the terminal by the network-side device by using same or different messages. In addition, any two pieces of information included in the first carrier configuration information may be transmitted to the terminal by the network-side device at a same time point or different time points. For example, the channel occupancy start reference time point and/or the channel listening start reference time point in the first carrier configuration information may be transmitted to the terminal by the network-side device at any time point after the first secondary carrier begins to occupy the channel; and the maximum continuous channel occupancy duration and the channel listening duration of the first secondary carrier in the first carrier configuration information may be transmitted to the terminal when the network-side device configures the first secondary carrier for the terminal, which is not limited in this embodiment of the present invention.

Further, the subframe determining module 32 may be specifically configured to determine a channel occupancy end time point or a channel listening start time point of the first secondary carrier according to the maximum continuous channel occupancy duration, the channel listening duration, and the channel occupancy start reference time point and/or the channel listening start reference time point included in the first carrier configuration information, use M symbols after the determined channel occupancy end time point or the determined channel listening start time point as the gap symbols, and use the subframe that includes all or some symbols of the M symbols as the special subframe, where the M symbols are determined according to the channel listening duration, and M is a positive integer that is greater than or equal to 1.

Further, in this embodiment of the present invention, ending of channel occupancy of the first secondary carrier may be limited to a subframe boundary, or ending is not limited to a subframe boundary, and when ending of channel occupancy of the first secondary carrier is limited to the subframe boundary, corresponding subframe boundary information such as subframe boundary information of a primary carrier or subframe boundary information of a second secondary carrier (the second secondary carrier is a contiguous carrier) of the terminal needs to be obtained. Therefore, correspondingly, when ending of channel occupancy of the first secondary carrier is limited to the subframe boundary, the terminal (which may be specifically the subframe determining module 32) further needs to perform subframe boundary detection to determine subframe boundary information such as subframe boundary information of the primary carrier or subframe boundary information of the second secondary carrier of the terminal.

Correspondingly, in this case, the subframe determining module 32 may be specifically configured to determine the channel occupancy end time point or the channel listening start time point of the first secondary carrier according to the maximum continuous channel occupancy duration, the channel listening duration, the channel occupancy start reference time point and/or the channel listening start reference time point, and subframe boundary information included in the first carrier configuration information, use the M symbols after the determined channel occupancy end time point or the determined channel listening start time point as the gap symbols, and use the subframe that includes all or some symbols of the M symbols as the special subframe.

Further, for example, ending of channel occupancy of the first secondary carrier is not limited to the subframe boundary, the first carrier configuration information includes the channel occupancy start reference time point of the first secondary carrier, and the channel occupancy start reference time point refers to a channel occupancy start time point when the first secondary carrier occupies the channel at a first time. The subframe determining module 32 may determine, according to the following formula, a channel occupancy end time point $t_N$ (or a channel listening start time point at an $N^{th}$ time of channel listening) $t_N$ when the first secondary carrier occupies the channel at an $N^{th}$ time:

$t_N=(t_{10}+T_1)+(N-1)(CCA+T_1)$, where $t_{10}$ indicates the channel occupancy start reference time point, $T_1$ indicates the maximum continuous channel occupancy duration of the first secondary carrier, the CCA indicates the channel listening duration, and N is a positive integer that is greater than or equal to 1.

Further, for example, ending of channel occupancy of the first secondary carrier is not limited to the subframe boundary, the first carrier configuration information includes the channel listening start reference time point of the first secondary carrier, and the channel listening start reference time point refers to a channel listening start time point at a first time of channel listening after the first secondary carrier begins to occupy the channel. The subframe determining module 32 may determine, according to the following formula, a channel occupancy end time point $t_N$ (or a channel listening start time point at an $N^{th}$ time of channel listening) when the first secondary carrier occupies the channel at an $N^{th}$ time:

$t_N=t_{20}+(N-1)(CCA+T_1)$, where $t_{20}$ indicates the channel listening start reference time point, $T_1$ indicates the maximum continuous channel occupancy duration of the first secondary carrier, and the CCA indicates the channel listening duration of the first secondary carrier.

Correspondingly, after the channel occupancy end time point when the first secondary carrier occupies the channel at the $N^{th}$ time or the channel listening start time point at the $N^{th}$ time of channel listening is determined, the corresponding gap symbols and the corresponding special subframe are determined according to the channel listening duration of the first secondary carrier.

It should be noted that, because when ending of channel occupancy of the first secondary carrier is not limited to the subframe boundary, the determined channel occupancy end time point when the first secondary carrier occupies the channel at the $N^{th}$ time or the channel listening start time point at the $N^{th}$ time of channel listening (namely, a start time point of a CCA) is not limited to a start location of a corresponding subframe, locations of the gap symbols are also dynamically changed, and a gap symbol may occur in any location in the subframe, which is not further described in this embodiment of the present invention.

Further, for example, ending of channel occupancy of the first secondary carrier is limited to the subframe boundary, the first carrier configuration information includes the channel occupancy start reference time point of the first secondary carrier, and the channel occupancy start reference time point refers to a channel occupancy start time point when the first secondary carrier occupies the channel at a first time. The subframe determining module 32 may determine, according to the following manner, a channel occupancy end time point (or a channel listening start time point at an $N^{th}$ time of channel listening) when the first secondary carrier occupies the channel at an $N^{th}$ time: when a value of N is 1, determining, according to the subframe boundary information included in the first carrier configuration information, whether a time point corresponding to a sum of the maximum continuous channel occupancy duration of the first secondary carrier and the channel occupancy start reference time point of the first secondary carrier is located at the subframe boundary, and if yes, using the time point corresponding to the sum of the maximum continuous channel occupancy duration of the first secondary carrier and the channel occupancy start reference time point of the first secondary carrier, as an end time point when the first secondary carrier occupies the channel at the first time, or if no, using a subframe start time point of a subframe in which the time point corresponding to the sum of the maximum continuous channel occupancy duration of the first secondary carrier and the channel occupancy start reference time point of the first secondary carrier is located, as an end time point when the first secondary carrier occupies the channel at the first time; and when a value of N is a positive integer that is greater than 1, using a determined end time point when the first secondary carrier occupies the channel at an $(N-1)^{th}$ time, as an $(N-1)^{th}$ end time point, using a sum of the channel listening duration and the maximum continuous channel occupancy duration of the first secondary carrier as a first period, and determining, according to the subframe boundary information included in the first carrier configuration information, whether a time point corresponding to a sum of the first period and the $(N-1)^{th}$ end time point is located at the subframe boundary, and if yes, using the time point corresponding to the sum of the first period and the $(N-1)^{th}$ end time point, as an end time point when the first secondary carrier occupies the channel at the $N^{th}$ time, or if no, using a subframe start time point of a subframe in which the time point corresponding to the sum of the first period and the $(N-1)^{th}$ end time point is located, as an end time point when the first secondary carrier occupies the channel at the $N^{th}$ time.

Further, for example, ending of channel occupancy of the first secondary carrier is limited to the subframe boundary, the first carrier configuration information includes the channel listening start reference time point of the first secondary carrier, and the channel listening start reference time point refers to a channel listening start time point at a first time of channel listening after the first secondary carrier begins to occupy the channel. The subframe determining module 32 may determine, according to the following manner, a channel occupancy end time point (or a channel listening start time point at an $N^{th}$ time of channel listening) when the first secondary carrier occupies the channel at an $N^{th}$ time: when a value of N is 1, directly using the channel listening start reference time point of the first secondary carrier as an end time point when the first secondary carrier occupies the channel at a first time; when a value of N is a positive integer that is greater than 1, using a determined end time point when the first secondary carrier occupies the channel at an $(N-1)^{th}$ time, as an $(N-1)^{th}$ end time point, using a sum of the channel listening duration and the maximum continuous channel occupancy duration of the first secondary carrier as a first period, determining, according to the subframe boundary information included in the first carrier configuration information, whether a time point corresponding to a sum of the first period and the $(N-1)^{th}$ end time point is located at the subframe boundary, and if yes, using the time point corresponding to the sum of the first period and the $(N-1)^{th}$ end time point, as an end time point when the first secondary carrier occupies the channel at the $N^{th}$ time, or if no, using a subframe start time point of a subframe in which the time point corresponding to the sum of the first period and the $(N-1)^{th}$ end time point is located, as an end time point when the first secondary carrier occupies the channel at the $N^{th}$ time.

Correspondingly, after the channel occupancy end time point when the first secondary carrier occupies the channel at the $N^{th}$ time or the channel listening start time point at the $N^{th}$ time of channel listening is determined, the corresponding gap symbols and the corresponding special subframe are determined according to the channel listening duration of the first secondary carrier.

It should be noted that, because when ending of channel occupancy of the first secondary carrier is limited to the subframe boundary, the determined channel occupancy end time point when the first secondary carrier occupies the channel at the $N^{th}$ time or the channel listening start time point at the $N^{th}$ time of channel listening (namely, a start time point of a CCA) is limited to a start location of a corresponding subframe, a start location of the gap symbols is also a start location of the corresponding subframe, which is not further described in this embodiment of the present invention.

It should be noted that, in this embodiment of the present invention, when the channel occupancy start time point of the first secondary carrier at the first time (namely, the first time) is located in a location of a certain symbol of a subframe 0 of a specified radio frame in the primary carrier or another contiguous secondary carrier of the terminal, the first secondary carrier may actually begin to use a corresponding channel from a location of a subframe start time point of a subframe 1 of the corresponding specified radio frame in the primary carrier or another contiguous secondary carrier of the terminal, so as to achieve an effect of aligning corresponding subframe boundaries, which is not further described in this embodiment of the present invention.

Specifically, the following describes in brief, according to specific instances, the process of determining the channel occupancy end time point (or the channel listening start time point at the $N^{th}$ time of channel listening) when the first secondary carrier occupies the channel at the $N^{th}$ time, and the corresponding gap symbols, and the special subframe in this embodiment of the present invention.

Figure 4:
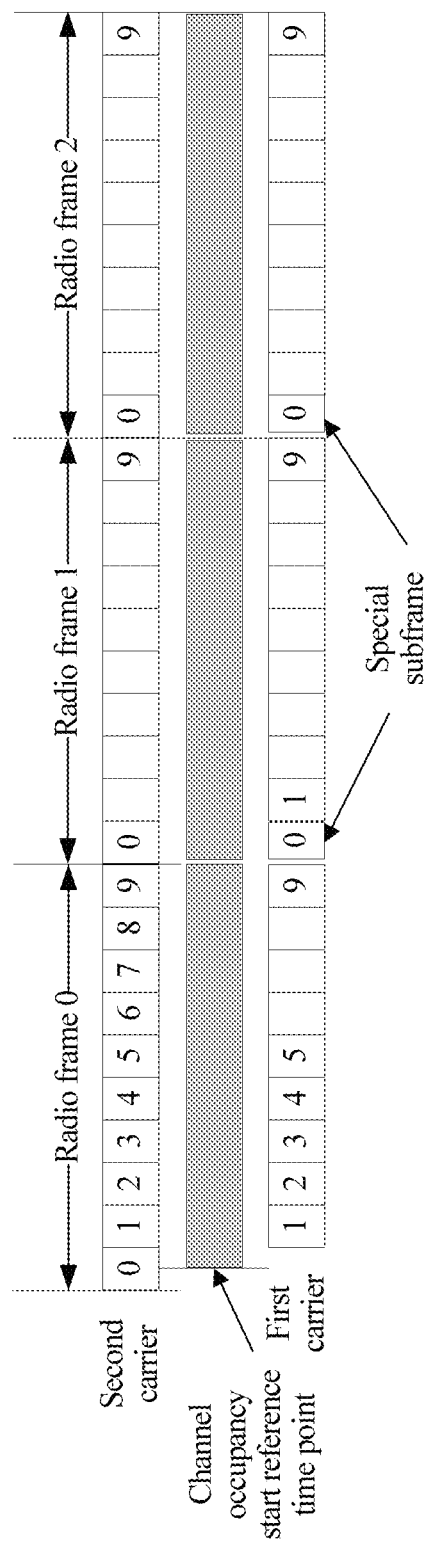
FIG. 4 shows a schematic structural diagram of locations of the gap symbol and the special subframe according to Embodiment 3 of the present invention.

As shown in FIG. 4, it is assumed that at least two operating carriers such as a first carrier and a second carrier are configured for the terminal, where the first carrier is a non-contiguous secondary carrier deployed in an unlicensed spectrum, a maximum continuous channel occupancy duration of the first carrier is 10 ms (namely, a duration occupied by a radio frame), a channel listening duration is 20 s (namely, less than one symbol), a channel occupancy start reference time point of the first carrier refers to a channel occupancy start time point when the first carrier occupies a channel at a first time, and the first carrier begins to occupy the channel from a middle location of a first subframe (subframe 0) of a radio frame 1 shown in FIG. 4 (that is, the channel occupancy start time point at the first time is a time point corresponding to the middle location in the first subframe in the radio frame 1).

If ending of channel occupancy of the first carrier is limited to a subframe boundary, in order that channel occupancy is ended at the subframe boundary, the first carrier needs to be ended at a subframe end time point (or a subframe start time point of a subframe 0 of a radio frame 2) of a subframe 9 of the radio frame 1 when occupying the channel at the first time. In this case, the channel occupancy end time point of the first carrier at the first time is the subframe end time point of the subframe 9 of the radio frame 1 shown in FIG. 4 (or the subframe start time point of the subframe 0 of the radio frame 2). Correspondingly, symbols occupied by the channel listening duration after the subframe end time point of the subframe 9 of the radio frame 1 (or the subframe start time point of the subframe 0 of the radio frame 2) are gap symbols, and a subframe having the gap symbols is a special subframe. Specifically, in FIG. 4, because the channel listening duration may merely occupy less than one symbol, the determined gap symbol is a first symbol of the subframe 0 of the radio frame 2, and the determined subframe is the subframe 0 of the radio frame 2. Similarly, according to the foregoing manner, it may be further determined that, the first carrier needs to be ended at a subframe end time point of a subframe 9 of the radio frame 2 (or a subframe start time point of a subframe 0 of a radio frame 3) when occupying the channel at a second time, that is, a channel occupancy end time point of the first carrier at the second time is the subframe end time point of the subframe 9 of the radio frame 2 (or the subframe start time point of the subframe 0 of the radio frame 3) shown in FIG. 4, and it may be further determined that a first symbol of the subframe 0 of the radio frame 3 is a gap symbol, and that the subframe 0 of the radio frame 3 is a special subframe, which is not further described in this embodiment of the present invention.

That is, in the schematic structural diagram of the carrier shown in FIG. 4, a determined channel occupancy end time point when the first carrier occupies the channel at an $N^{th}$ time or a channel listening start time point at an $N^{th}$ time of channel listening (namely, a start time point of a CCA) is limited to a start location of a corresponding subframe (or an end location of a previous subframe adjacent to the corresponding subframe). Therefore, a start location of the gap symbols is generally located in a start location of a corresponding subframe (or an end location of a previous subframe adjacent to the corresponding subframe), which is not further described in this embodiment of the present invention.

Further, it should be noted that, as shown in FIG. 4, when ending of channel occupancy of the first carrier is limited to a subframe boundary, an actual continuous channel occupancy duration every time when the first carrier occupies the channel may be less than 10 ms. For example, for aligning with the subframe boundary of the second carrier, the first carrier may generally actually begin to use the channel from a subframe 1 of the radio frame 1. In addition, in order that channel occupancy is ended at the subframe boundary, the first carrier needs to be ended at the subframe 9 of the radio frame 1 when occupying the channel at the first time, and a CCA is started at the subframe end time point of the subframe 9 of the radio frame 1. In this case, although the maximum continuous channel occupancy duration of the first carrier may be 10 ms, an actual occupancy is merely 9 ms. Certainly, it should be noted that, if the channel occupancy start time point of the first carrier at the first time is a subframe start time point of the subframe 0 of the radio frame, an actual continuous channel occupancy duration of the first carrier may be still 10 ms, which is not further described in this embodiment of the present invention.

Further, after the gap symbols and the corresponding special subframe are determined, the subframe processing module 33 may be used to perform processing on the corresponding special subframe.

Specifically, the subframe processing module 33 may be specifically configured to: if it is determined that the first carrier configuration information carries symbol location indication information used to indicate a PDSCH start symbol location, use, according to the PDSCH start symbol location indicated in the symbol location indication information, each non-gap symbol after the PDSCH start symbol location in the special subframe as a symbol that can be occupied by the PDSCH, where the symbol location indication information is sent to the terminal when the network-side device determines that the first secondary carrier is a cross-scheduled carrier; or may be specifically configured to read a PCFICH from a first symbol of the special subframe, determine, according to the PCFICH, the symbols that can be occupied by the PDCCH, and use all symbols except the gap symbols and the symbols that can be occupied by the PDCCH in the special subframe as the symbols that can be occupied by the PDSCH; or may be specifically configured to read a PCFICH from an $(M+1)^{th}$ symbol of the special subframe, determine, according to the PCFICH, the symbols that can be occupied by the PDCCH, and use all symbols except the gap symbols and the symbols that can be occupied by the PDCCH in the special subframe as the symbols that can be occupied by the PDSCH.

It should be noted that, if it is determined that the first carrier configuration information does not carry symbol location indication information used to indicate a PDSCH start symbol location, the subframe processing module 33 may be specifically configured to: for any special subframe, read a PCFICH from a first symbol of the special subframe or read a PCFICH from an $(M+1)^{th}$ symbol of the special subframe, determine, according to the PCFICH, the symbols that can be occupied by the PDCCH, and use all symbols except the gap symbols and the symbols that can be occupied by the PDCCH in the special subframe as the symbols that can be occupied by the PDSCH.

Further, it should be noted that, when the foregoing manner of reading a PCFICH is used to determine the symbols that can be occupied by the PDCCH and the symbols that can be occupied by the PDSCH, the subframe processing module 33 may be specifically configured to: for any special subframe, read a PCFICH from the first symbol of the special subframe when it is determined that the gap symbols in the special subframe are not located in a start location of the special subframe, and read a PCFICH from the $(M+1)^{th}$ symbol in the special subframe when it is determined that the gap symbols in the special subframe are located in the start location of the special subframe; or may be configured to first read a PCFICH from the first symbol in the special subframe, and when the reading fails, read a PCFICH from the $(M+1)^{th}$ symbol in the special subframe; or may be configured to first read a PCFICH from the $(M+1)^{th}$ symbol in the special subframe, and when the reading fails, read a PCFICH from the first symbol in the special subframe, which is not limited in this embodiment of the present invention.

Further, it should be noted that, in this embodiment of the present invention, for any special subframe, when it is determined that all symbols in the special subframe are gap symbols, that is, the channel listening duration may occupy a duration occupied by the entire subframe, the subframe processing module 33 may be further configured to stop corresponding receiving or decoding performed on the PDCCH and/or the PDSCH in the special subframe.

Further, the terminal may further include an information monitoring module 34.

The information monitoring module 34 may be configured to: for any gap symbol, perform energy detection on the gap symbol; and/or configured to monitor whether a carrier release message for the first secondary carrier is received from the network-side device.

The subframe processing module 33 may be further configured to: for any gap symbol, when it is determined that energy of the gap symbol detected by the information monitoring module 34 is higher than a specified energy threshold, stop receiving or decoding the special subframe that includes all or some symbols of the gap symbols; this is because for any gap symbol, in a location in which the gap symbol is located, the first secondary carrier of the network-side device does not transmit any data; if corresponding energy is detected in the location in which the gap symbol is located, it indicates that in a CCA period corresponding to the gap symbol, the channel occupied by the first secondary carrier is occupied by another network-side device, and therefore, it is also unnecessary to perform corresponding receiving or decoding on the PDCCH and/or the PDSCH after the gap symbol location any longer; or may be further configured to: when the information monitoring module 34 detects that the carrier release message for the first secondary carrier is received from the network-side device, stop a data receiving or decoding operation performed on the first secondary carrier.

Further, in this embodiment of the present invention, the information obtaining module 31 may be further configured to receive second carrier configuration information delivered for the first secondary carrier by the network-side device, where the second carrier configuration information may include any one or more types of the following information: system broadcast information of the first secondary carrier, where the system broadcast information can indicate that the first secondary carrier includes a common channel, where the common channel includes any one or more of a PBCH, a PSS, an SSS, or a reference signal; first indication information, where the first indication information is used to indicate that the first secondary carrier does not include a common channel; or second indication information, where the second indication information is used to indicate that a common channel used in the first secondary carrier is a common channel in an extended format; and the subframe processing module 33 may be further configured to: determine, according to the second carrier configuration information, whether the first secondary carrier includes the common channel, and when a determining result is yes, when receiving or decoding the PDCCH and/or the PDSCH in the subframe in the first secondary carrier, exclude, from the symbols that can be occupied by the PDCCH and/or the PDSCH in the subframe, symbols occupied by the common channel; or when a determining result is no, when receiving or decoding the PDCCH and/or the PDSCH in the subframe in the first secondary carrier, skip excluding, from the symbols that can be occupied by the PDCCH and/or the PDSCH in the subframe, symbols occupied by the common channel; or may be further configured to determine, according to the second carrier configuration information, whether the common channel in the extended format is used in the first secondary carrier, and when a determining result is yes, when receiving or decoding the PDCCH and/or the PDSCH in the subframe in the first secondary carrier, exclude, from the symbols that can be occupied by the PDCCH and/or the PDSCH in the subframe, symbols occupied by the common channel in the extended format; or when a determining result is no, when receiving or decoding the PDCCH and/or the PDSCH in the subframe in the first secondary carrier, skip excluding, from the symbols that can be occupied by the PDCCH and/or the PDSCH in the subframe, symbols occupied by the common channel in the extended format.

That is, for any carrier, when the terminal receives or decodes a PDCCH and/or a PDSCH in a subframe in the carrier, the terminal may flexibly select to exclude or skip excluding, according to received indication information about whether a common channel is included, symbols occupied by the common channel. In this way, a currently existing problem that a throughput is increased because a terminal still excludes, according to a specific location occupied by a common channel, symbols occupied by the common channel in a secondary carrier in which no corresponding common channel is configured, is resolved, and on a basis of improving flexibility of excluding, by the terminal, the symbols occupied by the common channel, an effect of reducing a throughput loss and improving efficiency of receiving or decoding the PDCCH and/or PDSCH by the terminal is achieved.

Specifically, the subframe processing module 33 may be specifically configured to: if it is determined that the second carrier configuration information includes the first indication information, or it is determined that the second carrier configuration information does not include the system broadcast information, determine that the first secondary carrier does not include the common channel; or may be specifically configured to: if it is determined that the second carrier configuration information does not include the first indication information, or it is determined that the second carrier configuration information includes the system broadcast information, determine that the first secondary carrier includes the common channel.

Similarly, the subframe processing module 33 may be specifically further configured to: if it is determined that the second carrier configuration information includes the second indication information, determine that the common channel in the extended format is used in the first secondary carrier; or may be specifically further configured to: if it is determined that the second carrier configuration information does not include the second indication information, determine that a common channel in a non-extended format is used in the first secondary carrier.

That is, in the technical solution of Embodiment 3 of the present invention, for any non-contiguous secondary carrier, the terminal can determine a special subframe in the non-contiguous secondary carrier according to a maximum continuous channel occupancy duration and a channel listening duration of the non-contiguous secondary carrier, and a channel occupancy start reference time point and/or a channel listening start reference time point of the non-contiguous secondary carrier that are obtained, where the special subframe includes all or some of gap symbols occupied by the channel listening duration, and for any special subframe, use all symbols except the gap symbols in the special subframe as symbols that can be occupied by a PDCCH and/or a PDSCH, and correspondingly receive or decode the PDCCH and/or the PDSCH in the special subframe according to the symbols that can be occupied by the PDCCH and/or the PDSCH. In this way, a currently existing problem that resource utilization is low because a gap symbol caused by a CCA cannot be excluded from an entire subframe is resolved, and channel utilization is improved if a channel is discontinuously occupied.

In addition, for any carrier, when the terminal receives or decodes a PDCCH and/or a PDSCH in a subframe in the carrier, the terminal may flexibly select to exclude or skip excluding, according to received indication information about whether a common channel is included, symbols occupied by the common channel. In this way, a currently existing problem that a throughput is increased because a terminal still excludes, according to a specific location occupied by a common channel, symbols occupied by the common channel in a secondary carrier in which no corresponding common channel is configured, is resolved, and on a basis of improving flexibility of excluding, by the terminal, the symbols occupied by the common channel, an effect of reducing a throughput loss and improving efficiency of receiving or decoding the PDCCH and/or PDSCH by the terminal is achieved.

Embodiment 4

Figure 5:
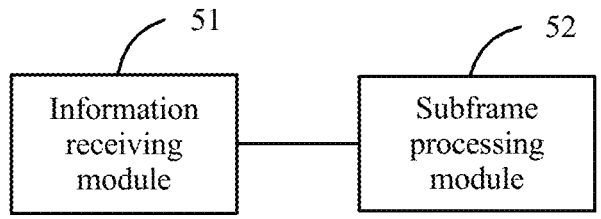
FIG. 5 shows a schematic structural diagram of the terminal according to Embodiment 4 of the present invention.

Embodiment 4 of the present invention provides a terminal, where the terminal may be a device such as a mobile phone that can perform communication and interaction with a network-side device, which is not limited in this embodiment of the present invention. Specifically, as shown in FIG. 5, FIG. 5 is a schematic structural diagram of the terminal in Embodiment 4 of the present invention. The terminal may specifically include an information receiving module 51 and a subframe processing module 52.

The information receiving module 51 may be configured to receive first carrier configuration information delivered for a first carrier by a network-side device, where the first carrier configuration information includes any one or more types of the following information: system broadcast information of the first carrier, where the system broadcast information can indicate that the first carrier includes a common channel, where the common channel includes any one or more of a PBCH, a PSS, an SSS, or a reference signal; first indication information, where the first indication information is used to indicate that the first carrier does not include a common channel; or second indication information, where the second indication information is used to indicate that a common channel used in the first carrier is a common channel in an extended format.

The subframe processing module 52 may be configured to determine, according to the first carrier configuration information, whether the first carrier includes the common channel, and when a determining result is yes, when receiving or decoding a physical downlink control channel PDCCH and/or a physical downlink shared channel PDSCH in a subframe in the first carrier, exclude, from symbols that can be occupied by the PDCCH and/or the PDSCH in the subframe, symbols occupied by the common channel; or when a determining result is no, when receiving or decoding a PDCCH and/or a PDSCH in a subframe in the first carrier, skip excluding, from symbols that can be occupied by the PDCCH and/or the PDSCH in the subframe, symbols occupied by the common channel; or determine, according to the first carrier configuration information, whether the common channel in the extended format is used in the first carrier, and when a determining result is yes, when receiving or decoding a PDCCH and/or a PDSCH in a subframe in the first carrier, exclude, from symbols that can be occupied by the PDCCH and/or the PDSCH in the subframe, symbols occupied by the common channel in the extended format; or when a determining result is no, when receiving or decoding a PDCCH and/or a PDSCH in a subframe in the first carrier, skip excluding, from symbols that can be occupied by the PDCCH and/or the PDSCH in the subframe, symbols occupied by the common channel in the extended format.

Specifically, the subframe processing module 52 may be specifically configured to: if it is determined that the first carrier configuration information includes the first indication information, or it is determined that the first carrier configuration information does not include the system broadcast information, determine that the first carrier does not include the common channel; or may be specifically configured to: if it is determined that the first carrier configuration information does not include the first indication information, or it is determined that the first carrier configuration information includes the system broadcast information, determine that the first carrier includes the common channel.

Similarly, the subframe processing module 52 may be specifically further configured to: if it is determined that the first carrier configuration information includes the second indication information, determine that the common channel in the extended format is used in the first carrier; or may be specifically further configured to: if it is determined that the first carrier configuration information does not include the second indication information, determine that a common channel in a non-extended format is used in the first carrier.

That is, in the technical solution of Embodiment 4 of the present invention, for any carrier configured for the terminal, when the terminal receives or decodes a PDCCH and/or a PDSCH in a subframe in the carrier, the terminal may flexibly select to exclude or skip excluding, according to received indication information about whether a common channel is included, symbols occupied by the common channel. In this way, a currently existing problem that a throughput is increased because a terminal still excludes, according to a specific location occupied by a common channel, symbols occupied by the common channel in a secondary carrier in which no corresponding common channel is configured, is resolved, and on a basis of improving flexibility of excluding, by the terminal, the symbols occupied by the common channel, an effect of reducing a throughput loss and improving efficiency of receiving or decoding the PDCCH and/or PDSCH by the terminal is achieved.

Embodiment 5

Figure 6:
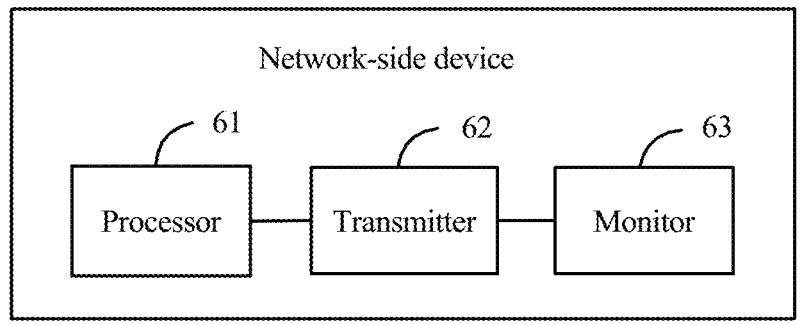
FIG. 6 shows a schematic structural diagram of the network-side device according to Embodiment 5 of the present invention.

Embodiment 5 of the present invention provides a network-side device, where the network-side device is a network-side entity device based on a same inventive conception as the network-side device in Embodiment 1 of the present invention. Specifically, as shown in FIG. 6, FIG. 6 is a schematic structural diagram of the network-side device in Embodiment 5 of the present invention. The network-side device may include components such as a processor 61 and a transmitter 62.

The processor 61 may be configured to determine first carrier configuration information of a first secondary carrier of a terminal, where the first secondary carrier is a non-contiguous carrier, and the first carrier configuration information includes a maximum continuous channel occupancy duration and a channel listening duration of the first secondary carrier, and further includes a channel occupancy start reference time point of the first secondary carrier and/or a channel listening start reference time point of the first secondary carrier.

The transmitter 62 may be configured to send the first carrier configuration information determined by the processor 61 to the terminal, so that the terminal performs the following operations according to the received first carrier configuration information: determining a special subframe in the first secondary carrier, where the special subframe includes all or some of gap symbols, and the gap symbols are symbols that are completely or partly occupied by the channel listening duration; and using all symbols except the gap symbols in the special subframe as symbols that can be occupied by a PDCCH and/or a PDSCH, and correspondingly receiving or decoding the PDCCH and/or the PDSCH in the special subframe according to the determined symbols that can be occupied by the PDCCH and/or the PDSCH.

Specifically, the transmitter 62 may be specifically configured to send the first carrier configuration information determined by the processor 61 to the terminal by using any one or more types of the following signaling: an RRC message, a MAC layer PDU message, or physical layer signaling, or the like. In addition, the transmitter 62 may be specifically configured to send any two pieces of information included in the first carrier configuration information to the terminal by using same or different messages. In addition, it should be noted that, the transmitter 62 may transmit any two pieces of information included in the first carrier configuration information to the terminal at a same time point or different time points. For example, the transmitter 62 may be specifically configured to send the channel occupancy start time point and/or the channel listening start time point in the first carrier configuration information to the terminal at any time point after the first secondary carrier begins to occupy the channel; and send the maximum continuous channel occupancy duration and the channel listening duration of the first secondary carrier in the first carrier configuration information to the terminal when the first secondary carrier is configured for the terminal, which is not limited in this embodiment of the present invention.

Further, the processor 61 may be further configured to designate a PDSCH start symbol location for the first secondary carrier before the determined first carrier configuration information is sent to the terminal if it is determined that the first secondary carrier is a cross-scheduled carrier.

Correspondingly, the transmitter 62 may be specifically configured to send, to the terminal when it is determined that the first secondary carrier is a cross-scheduled carrier, the first carrier configuration information carrying symbol location indication information used to indicate the PDSCH start symbol location, so that after the terminal determines the special subframe in the first secondary carrier according to the first carrier configuration information, the terminal uses, according to the PDSCH start symbol location indicated in the symbol location indication information, each non-gap symbol after the PDSCH start symbol location in the special subframe as a symbol that can be occupied by the PDSCH.

Further, the network-side device may further include a monitor 63.

The monitor 63 may be configured to monitor, after the first carrier configuration information of the first secondary carrier is determined, whether a channel corresponding to the first secondary carrier is occupied by another network-side device in a time period corresponding to the channel listening duration.

Correspondingly, the transmitter 62 may be further configured to send a carrier release message to the terminal when a monitoring result of the monitor 63 is yes (that is, when it is detected that the channel corresponding to the first secondary carrier is occupied by the another network-side device in the time period corresponding to the channel listening duration), so that the terminal stops, according to the carrier release message, a data receiving or decoding operation performed on the first secondary carrier.

Further, in this embodiment of the present invention, the processor 61 may be further configured to determine second carrier configuration information of the first secondary carrier, where the second carrier configuration information includes any one or more types of the following information: system broadcast information of the first secondary carrier, where the system broadcast information can indicate that the first secondary carrier includes a common channel, where the common channel includes any one or more of a PBCH, a PSS, an SSS, or a reference signal; first indication information, where the first indication information is used to indicate that the first secondary carrier does not include a common channel; or second indication information, where the second indication information is used to indicate that a common channel used in the first secondary carrier is a common channel in an extended format.

Correspondingly, the transmitter 62 may be further configured to send the second carrier configuration information determined by the processor 61 to the terminal, so that the terminal performs the following operation according to the received second carrier configuration information: determining whether the first secondary carrier includes the common channel, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel; or determining whether the common channel in the extended format is used in the first secondary carrier, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel in the extended format; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel in the extended format.

That is, in the technical solution of Embodiment 5 of the present invention, for any non-contiguous secondary carrier configured for a terminal, the network-side device may determine carrier configuration information such as a maximum continuous channel occupancy duration and a channel listening duration of the non-contiguous secondary carrier, and a channel occupancy start reference time point and/or a channel listening start reference time point of the non-contiguous secondary carrier, and send the determined carrier configuration information to the terminal, so that the terminal determines a special subframe in the non-contiguous secondary carrier according to the received carrier configuration information, and uses all symbols except gap symbols in the special subframe as symbols that can be occupied by a PDCCH and/or a PDSCH, and correspondingly receives or decodes the PDCCH and/or the PDSCH in the special subframe according to the determined symbols that can be occupied by the PDCCH and/or the PDSCH. In this way, a currently existing problem that resource utilization is low because a gap symbol caused by a CCA cannot be excluded from an entire subframe by a terminal is resolved, and channel utilization is improved if a channel is discontinuously occupied.

In addition, for any carrier configured for a terminal, the network-side device may transmit, to the terminal, indication information about whether a common channel is included in the carrier, so that when the terminal receives or decodes a PDCCH and/or a PDSCH in a subframe in the carrier, the terminal may flexibly select to exclude or skip excluding, according to the received indication information about whether the common channel is included, symbols occupied by the common channel. In this way, a currently existing problem that a throughput is increased because a terminal still excludes, according to a specific location occupied by a common channel, symbols occupied by the common channel in a secondary carrier in which no corresponding common channel is configured, is resolved, and on a basis of improving flexibility of excluding, by the terminal, the symbols occupied by the common channel, an effect of reducing a throughput loss and improving efficiency of receiving or decoding the PDCCH and/or PDSCH by the terminal is achieved.

Embodiment 6

Figure 7:
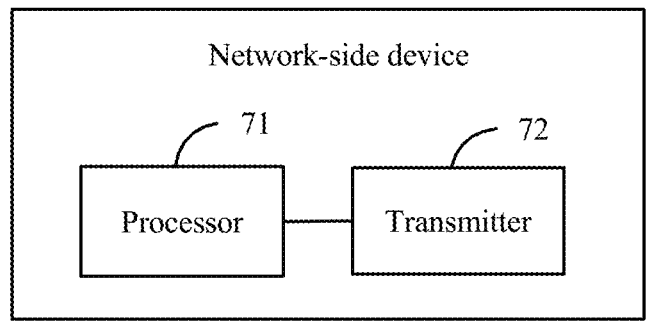
FIG. 7 shows a schematic structural diagram of the network-side device according to Embodiment 6 of the present invention.

Embodiment 6 of the present invention provides a network-side device, where the network-side device is a network-side entity device based on a same inventive conception as the network-side device in Embodiment 2 of the present invention. Specifically, as shown in FIG. 7, FIG. 7 is a schematic structural diagram of the network-side device in Embodiment 6 of the present invention. The network-side device may include components such as a processor 71 and a transmitter 72.

The processor 71 may be configured to determine first carrier configuration information of a first carrier of a terminal, where the first carrier configuration information includes any one or more types of the following information: system broadcast information of the first carrier, where the system broadcast information can indicate that the first carrier includes a common channel, where the common channel includes any one or more of a PBCH, a PSS, an SSS, or a reference signal; first indication information, where the first indication information is used to indicate that the first carrier does not include a common channel; or second indication information, where the second indication information is used to indicate that a common channel used in the first carrier is a common channel in an extended format.

The transmitter 72 may be configured to send the first carrier configuration information determined by the processor 71 to the terminal, so that the terminal performs the following operation according to the received first carrier configuration information: determining whether the first carrier includes the common channel, and when a determining result is yes, when receiving or decoding a PDCCH and/or a PDSCH in a subframe in the first carrier, excluding, from symbols that can be occupied by the PDCCH and/or the PDSCH in the subframe, symbols occupied by the common channel; or when a determining result is no, when receiving or decoding a PDCCH and/or a PDSCH in a subframe in the first carrier, skipping excluding, from symbols that can be occupied by the PDCCH and/or the PDSCH in the subframe, symbols occupied by the common channel; or determining whether the common channel in the extended format is used in the first carrier, and when a determining result is yes, when receiving or decoding a PDCCH and/or a PDSCH in a subframe in the first carrier, excluding, from symbols that can be occupied by the PDCCH and/or the PDSCH in the subframe, symbols occupied by the common channel in the extended format; or when a determining result is no, when receiving or decoding a PDCCH and/or a PDSCH in a subframe in the first carrier, skipping excluding, from symbols that can be occupied by the PDCCH and/or the PDSCH in the subframe, symbols occupied by the common channel in the extended format.

That is, in the technical solution of Embodiment 6 of the present invention, for any carrier configured for a terminal, the network-side device may transmit, to the terminal, indication information about whether a common channel is included in the carrier, so that when the terminal receives or decodes a PDCCH and/or a PDSCH in a subframe in the carrier, the terminal may flexibly select to exclude or skip excluding, according to the received indication information about whether the common channel is included, symbols occupied by the common channel. In this way, a currently existing problem that a throughput is increased because a terminal still excludes, according to a specific location occupied by a common channel, symbols occupied by the common channel in a secondary carrier in which no corresponding common channel is configured, is resolved, and on a basis of improving flexibility of excluding, by the terminal, the symbols occupied by the common channel, an effect of reducing a throughput loss and improving efficiency of receiving or decoding the PDCCH and/or PDSCH by the terminal is achieved.

Embodiment 7

Figure 8:
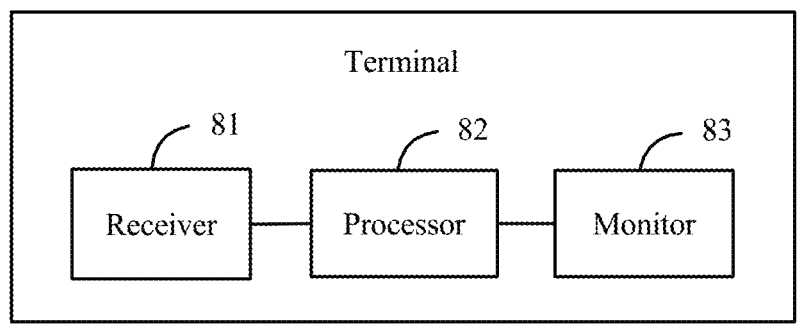
FIG. 8 shows a schematic structural diagram of the terminal according to Embodiment 7 of the present invention.

Embodiment 7 of the present invention provides a terminal, where the terminal is a terminal entity device based on a same inventive conception as the terminal in Embodiment 3 of the present invention. Specifically, as shown in FIG. 8, FIG. 8 is a schematic structural diagram of the terminal in Embodiment 7 of the present invention. The terminal may include components such as a receiver 81 and a processor 82.

The receiver 81 may be configured to obtain first carrier configuration information of a first secondary carrier, where the first secondary carrier is a non-contiguous carrier, and the first carrier configuration information includes a maximum continuous channel occupancy duration and a channel listening duration of the first secondary carrier, and further includes a channel occupancy start reference time point and/or a channel listening start reference time point of the first secondary carrier.

The processor 82 may be configured to determine a special subframe in the first secondary carrier according to the first carrier configuration information obtained by the receiver 81, where the special subframe includes all or some of gap symbols, and the gap symbols are symbols that are completely or partly occupied by the channel listening duration; and use all symbols except the gap symbols in the determined special subframe as symbols that can be occupied by a PDCCH and/or a PDSCH, and correspondingly receive or decode the PDCCH and/or the PDSCH in the special subframe according to the determined symbols that can be occupied by the PDCCH and/or the PDSCH.

Specifically, the first carrier configuration information may be generally configured and sent by a network-side device such as a base station to the terminal. Certainly, it should be noted that, the first carrier configuration information may also be predefined according to a specified rule and stored in the terminal, which is not limited in this embodiment of the present invention.

Further, when the first carrier configuration information is sent to the terminal by the network-side device, the first carrier configuration information may be transmitted to the terminal by the network-side device by using any one or more types of the following signaling: an RRC message, a MAC layer PDU message, or physical layer signaling, or the like. In addition, any two pieces of information included in the first carrier configuration information may be transmitted to the terminal by the network-side device by using same or different messages. In addition, any two pieces of information included in the first carrier configuration information may be transmitted to the terminal by the network-side device at a same time point or different time points, which is not limited in this embodiment of the present invention.

Further, the processor 82 may be specifically configured to determine a channel occupancy end time point or a channel listening start time point of the first secondary carrier according to the maximum continuous channel occupancy duration, the channel listening duration, and the channel occupancy start reference time point and/or the channel listening start reference time point included in the first carrier configuration information, use M symbols after the determined channel occupancy end time point or the determined channel listening start time point as the gap symbols, and use the subframe that includes all or some symbols of the M symbols as the special subframe, where the M symbols are determined according to the channel listening duration, and M is a positive integer that is greater than or equal to 1.

Further, ending of channel occupancy of the first secondary carrier may be limited to a subframe boundary, or ending is not limited to a subframe boundary, and when ending of channel occupancy of the first secondary carrier is limited to the subframe boundary, corresponding subframe boundary information such as subframe boundary information of a primary carrier or subframe boundary information of a second secondary carrier of the terminal needs to be obtained. Therefore, correspondingly, when ending of channel occupancy of the first secondary carrier is limited to the subframe boundary, the terminal (which may be specifically the processor 82) further needs to perform subframe boundary detection to determine subframe boundary information such as subframe boundary information of the primary carrier or subframe boundary information of the second secondary carrier of the terminal.

Correspondingly, in this case, the processor 82 may be specifically configured to determine the channel occupancy end time point or the channel listening start time point of the first secondary carrier according to the maximum continuous channel occupancy duration, the channel listening duration, the channel occupancy start reference time point and/or the channel listening start reference time point, and subframe boundary information included in the first carrier configuration information, use the M symbols after the determined channel occupancy end time point or the determined channel listening start time point as the gap symbols, and use the subframe that includes all or some symbols of the M symbols as the special subframe.

Further, after the gap symbols and the corresponding special subframe are determined, processing may be performed on the corresponding special subframe. Specifically, the processor 82 may be specifically configured to: if it is determined that the first carrier configuration information carries symbol location indication information used to indicate a PDSCH start symbol location, use, according to the PDSCH start symbol location indicated in the symbol location indication information, each non-gap symbol after the PDSCH start symbol location in the special subframe as a symbol that can be occupied by the PDSCH; or may be specifically configured to read a PCFICH from a first symbol of the special subframe, determine, according to the PCFICH, the symbols that can be occupied by the PDCCH, and use all symbols except the gap symbols and the symbols that can be occupied by the PDCCH in the special subframe as the symbols that can be occupied by the PDSCH; or may be specifically configured to read a PCFICH from an $(M+1)^{th}$ symbol of the special subframe, determine, according to the PCFICH, the symbols that can be occupied by the PDCCH, and use all symbols except the gap symbols and the symbols that can be occupied by the PDCCH in the special subframe as the symbols that can be occupied by the PDSCH.

It should be noted that, if it is determined that the first carrier configuration information does not carry symbol location indication information used to indicate a PDSCH start symbol location, the processor 82 may be specifically configured to: for any special subframe, read a PCFICH from a first symbol of the special subframe or read a PCFICH from an $(M+1)^{th}$ symbol of the special subframe, and determine, according to the PCFICH, the symbols that can be occupied by the PDCCH, and use all symbols except the gap symbols and the symbols that can be occupied by the PDCCH in the special subframe as the symbols that can be occupied by the PDSCH.

Further, it should be noted that, in this embodiment of the present invention, for any special subframe, when it is determined that all symbols in the special subframe are gap symbols, that is, the channel listening duration may occupy a duration occupied by the entire subframe, the processor 82 may be further configured to stop corresponding receiving or decoding performed on the PDCCH and/or the PDSCH in the special subframe.

Further, the terminal may further include a monitor 83.

The monitor 83 may be configured to: for any gap symbol, perform energy detection on the gap symbol; and/or configured to monitor whether a carrier release message for the first secondary carrier is received from the network-side device.

The processor 82 may be further configured to: for any gap symbol, when it is determined that energy of the gap symbol detected by the monitor 83 is higher than a specified energy threshold, stop receiving or decoding the special subframe that includes all or some symbols of the gap symbols; or when the monitor 83 detects that the carrier release message for the first secondary carrier is received from the network-side device, further configured to stop a data receiving or decoding operation performed on the first secondary carrier.

Further, the receiver 81 may be further configured to receive second carrier configuration information delivered for the first secondary carrier by the network-side device, where the second carrier configuration information includes any one or more types of the following information: system broadcast information of the first secondary carrier, where the system broadcast information can indicate that the first secondary carrier includes a common channel, where the common channel includes any one or more of a PBCH, a PSS, an SSS, or a reference signal; first indication information, where the first indication information is used to indicate that the first secondary carrier does not include a common channel; or second indication information, where the second indication information is used to indicate that a common channel used in the first secondary carrier is a common channel in an extended format.

The processor 82 may be further configured to: determine, according to the second carrier configuration information, whether the first secondary carrier includes the common channel, and when a determining result is yes, when receiving or decoding the PDCCH and/or the PDSCH in the subframe in the first secondary carrier, exclude, from the symbols that can be occupied by the PDCCH and/or the PDSCH in the subframe, symbols occupied by the common channel; or when a determining result is no, when receiving or decoding the PDCCH and/or the PDSCH in the subframe in the first secondary carrier, skip excluding, from the symbols that can be occupied by the PDCCH and/or the PDSCH in the subframe, symbols occupied by the common channel; or may be further configured to determine, according to the second carrier configuration information, whether the common channel in the extended format is used in the first secondary carrier, and when a determining result is yes, when receiving or decoding the PDCCH and/or the PDSCH in the subframe in the first secondary carrier, exclude, from the symbols that can be occupied by the PDCCH and/or the PDSCH in the subframe, symbols occupied by the common channel in the extended format; or when a determining result is no, when receiving or decoding the PDCCH and/or the PDSCH in the subframe in the first secondary carrier, skip excluding, from the symbols that can be occupied by the PDCCH and/or the PDSCH in the subframe, symbols occupied by the common channel in the extended format.

Specifically, the processor 82 may be specifically configured to: if it is determined that the second carrier configuration information includes the first indication information, or it is determined that the second carrier configuration information does not include the system broadcast information, determine that the first secondary carrier does not include the common channel; or may be specifically configured to: if it is determined that the second carrier configuration information does not include the first indication information, or it is determined that the second carrier configuration information includes the system broadcast information, determine that the first secondary carrier includes the common channel.

Similarly, the processor 82 may be specifically configured to: if it is determined that the second carrier configuration information includes the second indication information, determine that the common channel in the extended format is used in the first secondary carrier; or may be specifically configured to: if it is determined that the second carrier configuration information does not include the second indication information, determine that a common channel in a non-extended format is used in the first secondary carrier.

That is, in the technical solution of Embodiment 7 of the present invention, for any non-contiguous secondary carrier, the terminal can determine a special subframe in the non-contiguous secondary carrier according to a maximum continuous channel occupancy duration and a channel listening duration of the non-contiguous secondary carrier, and a channel occupancy start reference time point and/or a channel listening start reference time point of the non-contiguous secondary carrier that are obtained, where the special subframe includes all or some of gap symbols occupied by the channel listening duration, and for any special subframe, use all symbols except the gap symbols in the special subframe as symbols that can be occupied by a PDCCH and/or a PDSCH, and correspondingly receive or decode the PDCCH and/or the PDSCH in the special subframe according to the symbols that can be occupied by the PDCCH and/or the PDSCH. In this way, a currently existing problem that resource utilization is low because a gap symbol caused by a CCA cannot be excluded from an entire subframe is resolved, and channel utilization is improved if a channel is discontinuously occupied.

In addition, for any carrier, when the terminal receives or decodes a PDCCH and/or a PDSCH in a subframe in the carrier, the terminal may flexibly select to exclude or skip excluding, according to received indication information about whether a common channel is included, symbols occupied by the common channel. In this way, a currently existing problem that a throughput is increased because a terminal still excludes, according to a specific location occupied by a common channel, symbols occupied by the common channel in a secondary carrier in which no corresponding common channel is configured, is resolved, and on a basis of improving flexibility of excluding, by the terminal, the symbols occupied by the common channel, an effect of reducing a throughput loss and improving efficiency of receiving or decoding the PDCCH and/or PDSCH by the terminal is achieved.

Embodiment 8

Figure 9:
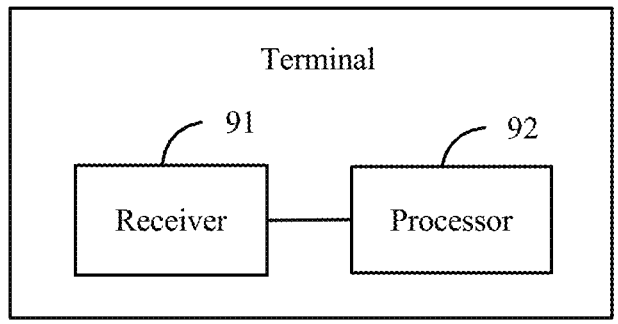
FIG. 9 shows a schematic structural diagram of the terminal according to Embodiment 8 of the present invention.

Embodiment 8 of the present invention provides a terminal, where the terminal is a terminal entity device based on a same inventive conception as the terminal in Embodiment 4 of the present invention. Specifically, as shown in FIG. 9, FIG. 9 is a schematic structural diagram of the terminal in Embodiment 8 of the present invention. The terminal may include components such as a receiver 91 and a processor 92.

The receiver 91 may be configured to receive first carrier configuration information delivered for a first carrier by a network-side device, where the first carrier configuration information includes any one or more types of the following information: system broadcast information of the first carrier, where the system broadcast information can indicate that the first carrier includes a common channel, where the common channel includes any one or more of a PBCH, a PSS, an SSS, or a reference signal; first indication information, where the first indication information is used to indicate that the first carrier does not include a common channel; or second indication information, where the second indication information is used to indicate that a common channel used in the first carrier is a common channel in an extended format.

The processor 92 may be configured to determine, according to the first carrier configuration information, whether the first carrier includes the common channel, and when a determining result is yes, when receiving or decoding a PDCCH and/or a PDSCH in a subframe in the first carrier, exclude, from symbols that can be occupied by the PDCCH and/or the PDSCH in the subframe, symbols occupied by the common channel; or when a determining result is no, when receiving or decoding a PDCCH and/or a PDSCH in a subframe in the first carrier, skip excluding, from symbols that can be occupied by the PDCCH and/or the PDSCH in the subframe, symbols occupied by the common channel; or determine, according to the first carrier configuration information, whether the common channel in the extended format is used in the first carrier, and when a determining result is yes, when receiving or decoding a PDCCH and/or a PDSCH in a subframe in the first carrier, exclude, from symbols that can be occupied by the PDCCH and/or the PDSCH in the subframe, symbols occupied by the common channel in the extended format; or when a determining result is no, when receiving or decoding a PDCCH and/or a PDSCH in a subframe in the first carrier, skip excluding, from symbols that can be occupied by the PDCCH and/or the PDSCH in the subframe, symbols occupied by the common channel in the extended format.

Specifically, the processor 92 may be specifically configured to: if it is determined that the first carrier configuration information includes the first indication information, or it is determined that the first carrier configuration information does not include the system broadcast information, determine that the first carrier does not include the common channel; or may be specifically configured to: if it is determined that the first carrier configuration information does not include the first indication information, or it is determined that the first carrier configuration information includes the system broadcast information, determine that the first carrier includes the common channel.

Similarly, the processor 92 may be specifically configured to: if it is determined that the first carrier configuration information includes the second indication information, determine that the common channel in the extended format is used in the first carrier; or may be specifically configured to: if it is determined that the first carrier configuration information does not include the second indication information, determine that a common channel in a non-extended format is used in the first carrier.

That is, in the technical solution of Embodiment 8 of the present invention, for any carrier configured for the terminal, when the terminal receives or decodes a PDCCH and/or a PDSCH in a subframe in the carrier, the terminal may flexibly select to exclude or skip excluding, according to received indication information about whether a common channel is included, symbols occupied by the common channel. In this way, a currently existing problem that a throughput is increased because a terminal still excludes, according to a specific location occupied by a common channel, symbols occupied by the common channel in a secondary carrier in which no corresponding common channel is configured, is resolved, and on a basis of improving flexibility of excluding, by the terminal, the symbols occupied by the common channel, an effect of reducing a throughput loss and improving efficiency of receiving or decoding the PDCCH and/or PDSCH by the terminal is achieved.

Embodiment 9

Figure 10:
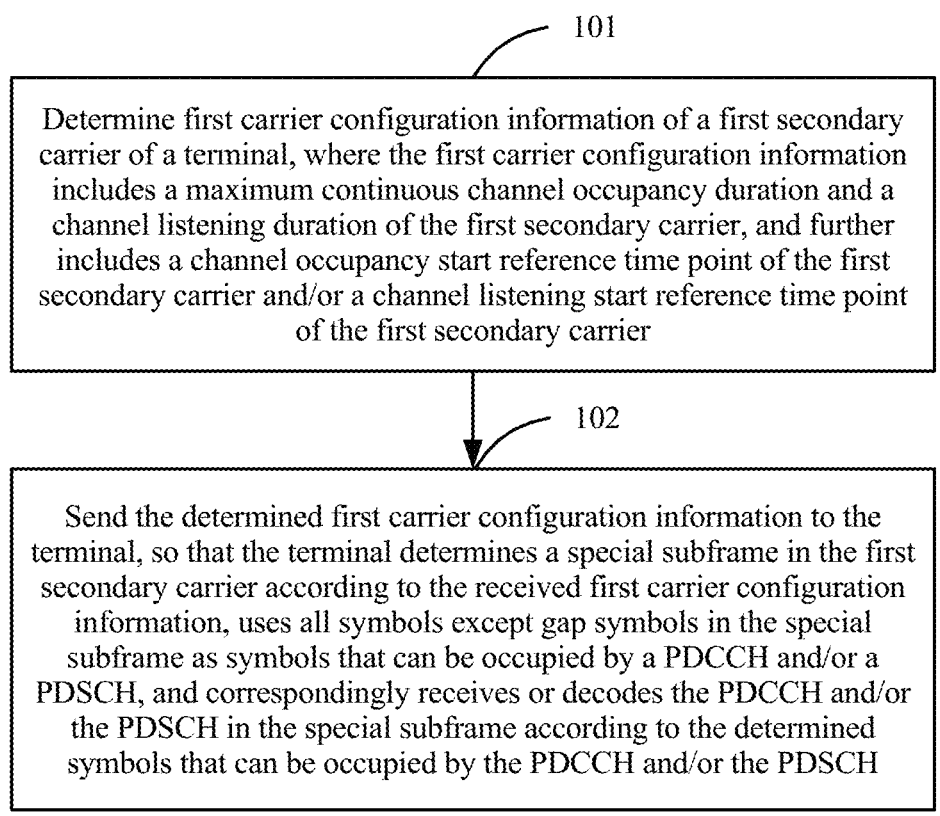
FIG. 10 shows a schematic flowchart of the subframe processing method according to Embodiment 9 of the present invention.

Embodiment 9 of the present invention provides a subframe processing method that may be applicable to the network-side device in Embodiment 1 or Embodiment 5 of the present invention. As shown in FIG. 10, FIG. 10 is a schematic flowchart of the subframe processing method in Embodiment 9 of the present invention. The subframe processing method may include the following steps.

Step 101: A network-side device determines first carrier configuration information of a first secondary carrier of a terminal, where the first secondary carrier is a non-contiguous carrier, and the first carrier configuration information includes a maximum continuous channel occupancy duration and a channel listening duration of the first secondary carrier, and further includes a channel occupancy start reference time point of the first secondary carrier and/or a channel listening start reference time point of the first secondary carrier.

Specifically, in this embodiment of the present invention, the first secondary carrier may generally refer to any non-contiguous secondary carrier in at least one non-contiguous secondary carrier configured for the terminal by the network-side device such as a base station. In addition, the first secondary carrier may be a carrier in an unlicensed spectrum, an asymmetric carrier, or a single downlink carrier, or the like. Details are not described in this embodiment of the present invention.

Further, it should be noted that, in this embodiment of the present invention, the determined channel occupancy start reference time point of the first secondary carrier may generally refer to a channel occupancy start point when the first secondary carrier occupies a channel at any time, and the determined channel listening start reference time point of the first secondary carrier may generally refer to a channel listening start time point at any time of channel listening after the first secondary carriers begins to occupy the channel, which is not limited in this embodiment of the present invention.

Step 102: The network-side device transmits the determined first carrier configuration information to the terminal, so that the terminal performs the following operations according to the received first carrier configuration information: determining a special subframe in the first secondary carrier, where the special subframe includes all or some of gap symbols, and the gap symbols are symbols that are completely or partly occupied by the channel listening duration; and using all symbols except the gap symbols in the special subframe as symbols that can be occupied by a PDCCH and/or a PDSCH, and correspondingly receiving or decoding the PDCCH and/or the PDSCH in the special subframe according to the determined symbols that can be occupied by the PDCCH and/or the PDSCH.

Specifically, the network-side device may transmit the determined first carrier configuration information to the terminal by using any one or more types of the following signaling: an RRC message, a MAC layer PDU message, or physical layer signaling. In addition, the network-side device may transmit any two pieces of information included in the first carrier configuration information to the terminal by using same or different messages. In addition, the network-side device may transmit any two pieces of information included in the first carrier configuration information to the terminal at a same time point or different time points, which is not limited in this embodiment of the present invention.

Further, in this embodiment of the present invention, before the transmitting the determined first carrier configuration information to the terminal, the method may further include: determining whether the first secondary carrier is a cross-scheduled carrier, and if a determining result is yes, designating a PDSCH start symbol location for the first secondary carrier.

Correspondingly, the transmitting the determined first carrier configuration information to the terminal may include: when it is determined that the first secondary carrier is a cross-scheduled carrier, transmitting, to the terminal, the first carrier configuration information carrying symbol location indication information used to indicate the PDSCH start symbol location, so that after the terminal determines the special subframe in the first secondary carrier according to the first carrier configuration information, the terminal uses, according to the PDSCH start symbol location indicated in the symbol location indication information, each non-gap symbol after the PDSCH start symbol location in the special subframe as a symbol that can be occupied by the PDSCH.

Further, in this embodiment of the present invention, after the determining first carrier configuration information of a first secondary carrier, the method may further include: monitoring whether a channel corresponding to the first secondary carrier is occupied by another network-side device in a time period corresponding to the channel listening duration; and if a monitoring result is yes, transmitting a carrier release message to the terminal, so that the terminal stops, according to the carrier release message, a data receiving or decoding operation performed on the first secondary carrier.

Further, in this embodiment of the present invention, the method may further include: determining second carrier configuration information of the first secondary carrier, where the second carrier configuration information may include any one or more types of the following information: system broadcast information of the first secondary carrier, where the system broadcast information can indicate that the first secondary carrier includes a common channel, where the common channel includes any one or more of a PBCH, a PSS, an SSS, or a reference signal; first indication information, where the first indication information is used to indicate that the first secondary carrier does not include a common channel; or second indication information, where the second indication information is used to indicate that a common channel used in the first secondary carrier is a common channel in an extended format; and transmitting the determined second carrier configuration information to the terminal, so that the terminal performs the following operation according to the received second carrier configuration information: determining whether the first secondary carrier includes the common channel, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel; or determining whether the common channel in the extended format is used in the first secondary carrier, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel in the extended format; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel in the extended format.

That is, in the technical solution of Embodiment 9 of the present invention, for any non-contiguous secondary carrier configured for a terminal, a network-side device may determine carrier configuration information such as a maximum continuous channel occupancy duration and a channel listening duration of the non-contiguous secondary carrier, and a channel occupancy start reference time point and/or a channel listening start reference time point of the non-contiguous secondary carrier, and send the determined carrier configuration information to the terminal, so that the terminal determines a special subframe in the non-contiguous secondary carrier according to the received carrier configuration information, and uses all symbols except gap symbols in the special subframe as symbols that can be occupied by a PDCCH and/or a PDSCH, and correspondingly receives or decodes the PDCCH and/or the PDSCH in the special subframe according to the determined symbols that can be occupied by the PDCCH and/or the PDSCH. In this way, a currently existing problem that resource utilization is low because a gap symbol caused by a CCA cannot be excluded from an entire subframe by a terminal is resolved, and channel utilization is improved if a channel is discontinuously occupied.

In addition, for any carrier configured for a terminal, the network-side device may transmit, to the terminal, indication information about whether a common channel is included in the carrier, so that when the terminal receives or decodes a PDCCH and/or a PDSCH in a subframe in the carrier, the terminal may flexibly select to exclude or skip excluding, according to the received indication information about whether the common channel is included, symbols occupied by the common channel. In this way, a currently existing problem that a throughput is increased because a terminal still excludes, according to a specific location occupied by a common channel, symbols occupied by the common channel in a secondary carrier in which no corresponding common channel is configured, is resolved, and on a basis of improving flexibility of excluding, by the terminal, the symbols occupied by the common channel, an effect of reducing a throughput loss and improving efficiency of receiving or decoding the PDCCH and/or PDSCH by the terminal is achieved.

Embodiment 10

Embodiment 10 of the present invention provides a subframe processing method that may be applicable to the network-side device in Embodiment 2 or Embodiment 6 of the present invention. The subframe processing method may include the following steps.

Step 1: A network-side device determines first carrier configuration information of a first carrier of a terminal, where the first carrier configuration information includes any one or more types of the following information: system broadcast information of the first carrier, where the system broadcast information can indicate that the first carrier includes a common channel, where the common channel includes any one or more of a PBCH, a PSS, an SSS, or a reference signal; first indication information, where the first indication information is used to indicate that the first carrier does not include a common channel; or second indication information, where the second indication information is used to indicate that a common channel used in the first carrier is a common channel in an extended format.

Specifically, the network-side device may determine the first carrier configuration information of the first carrier when configuring the corresponding first carrier for the terminal, or may determine the first carrier configuration information of the first carrier after configuring the corresponding first carrier for the terminal, which is not limited in this embodiment of the present invention.

Further, in this embodiment of the present invention, the first carrier may be any non-contiguous carrier or any contiguous carrier configured by the network-side device for the terminal, which is also not limited in this embodiment of the present invention.

Step 2: The network-side device transmits the determined first carrier configuration information to the terminal, so that the terminal performs the following operation according to the received first carrier configuration information: determining whether the first carrier includes the common channel, and when a determining result is yes, when receiving or decoding a PDCCH and/or a PDSCH in a subframe in the first carrier, excluding, from symbols that can be occupied by the PDCCH and/or the PDSCH in the subframe, symbols occupied by the common channel; or when a determining result is no, when receiving or decoding a PDCCH and/or a PDSCH in a subframe in the first carrier, skipping excluding, from symbols that can be occupied by the PDCCH and/or the PDSCH in the subframe, symbols occupied by the common channel; or determining whether the common channel in the extended format is used in the first carrier, and when a determining result is yes, when receiving or decoding a PDCCH and/or a PDSCH in a subframe in the first carrier, excluding, from symbols that can be occupied by the PDCCH and/or the PDSCH in the subframe, symbols occupied by the common channel in the extended format; or when a determining result is no, when receiving or decoding a PDCCH and/or a PDSCH in a subframe in the first carrier, skipping excluding, from symbols that can be occupied by the PDCCH and/or the PDSCH in the subframe, symbols occupied by the common channel in the extended format.

That is, in the technical solution of Embodiment 10 of the present invention, for any carrier configured for a terminal, a network-side device may transmit, to the terminal, indication information about whether a common channel is included in the carrier, so that when the terminal receives or decodes a PDCCH and/or a PDSCH in a subframe in the carrier, the terminal may flexibly select to exclude or skip excluding, according to the received indication information about whether the common channel is included, symbols occupied by the common channel. In this way, a currently existing problem that a throughput is increased because a terminal still excludes, according to a specific location occupied by a common channel, symbols occupied by the common channel in a secondary carrier in which no corresponding common channel is configured, is resolved, and on a basis of improving flexibility of excluding, by the terminal, the symbols occupied by the common channel, an effect of reducing a throughput loss and improving efficiency of receiving or decoding the PDCCH and/or PDSCH by the terminal is achieved.

Embodiment 11

Figure 11:
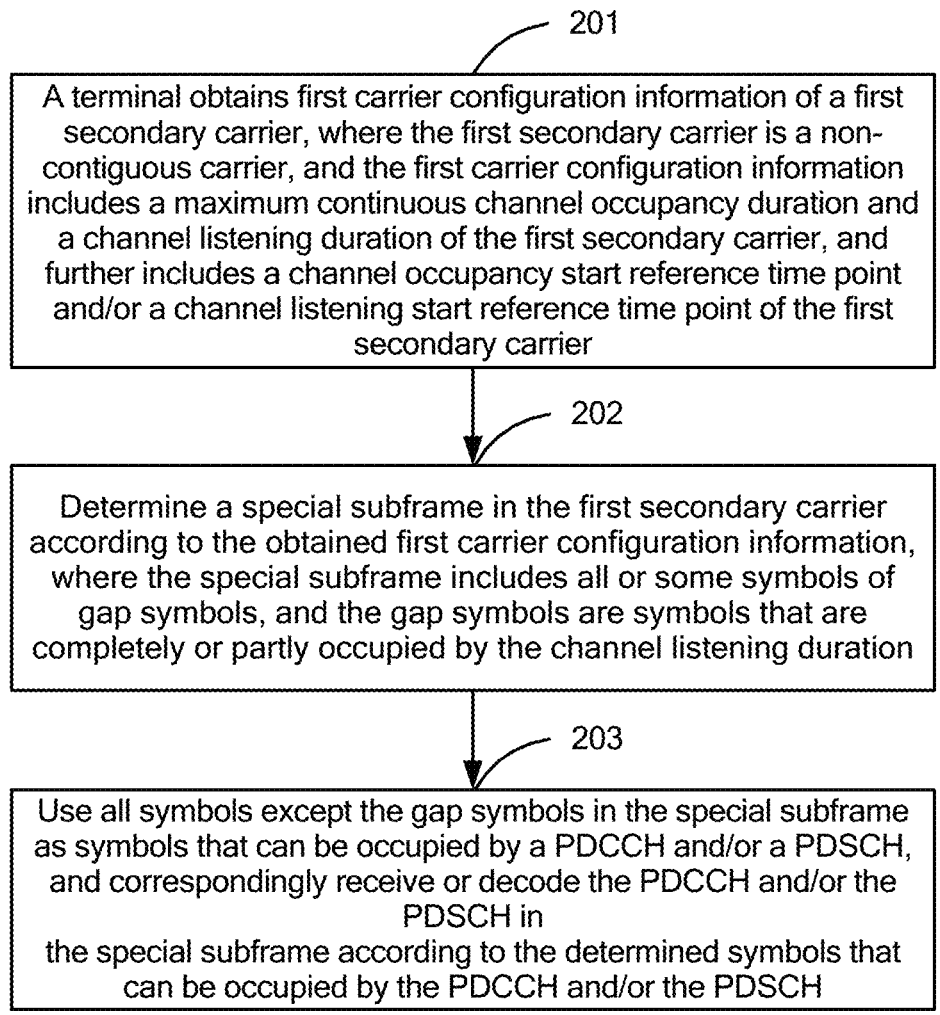
FIG. 11 shows a schematic flowchart of the subframe processing method according to Embodiment 11 of the present invention.

In Embodiment 11 of the present invention, assuming that actions are performed by the terminal in Embodiment 3 or Embodiment 7 of the present invention, the subframe processing method in Embodiment 9 of the present invention is further described. As shown in FIG. 11, FIG. 11 is a schematic flowchart of the subframe processing method in Embodiment 11 of the present invention. The subframe processing method may include the following steps.

Step 201: A terminal obtains first carrier configuration information of a first secondary carrier, where the first secondary carrier is a non-contiguous carrier, and the first carrier configuration information includes a maximum continuous channel occupancy duration and a channel listening duration of the first secondary carrier, and further includes a channel occupancy start reference time point and/or a channel listening start reference time point of the first secondary carrier.

Specifically, in this embodiment of the present invention, the first carrier configuration information may be generally configured and sent by a network-side device such as a base station to the terminal. Certainly, it should be noted that, the first carrier configuration information may also be predefined according to a specified rule and stored in the terminal, which is not limited in this embodiment of the present invention.

Further, when the first carrier configuration information is sent to the terminal by the network-side device, the first carrier configuration information may be transmitted to the terminal by the network-side device by using any one or more types of the following signaling: an RRC message, a MAC layer PDU message, or physical layer signaling, or the like. In addition, any two pieces of information included in the first carrier configuration information may be transmitted to the terminal by the network-side device by using same or different messages. In addition, any two pieces of information included in the first carrier configuration information may be transmitted to the terminal by the network-side device at a same time point or different time points, which is not limited in this embodiment of the present invention.

Step 202: Determine a special subframe in the first secondary carrier according to the obtained first carrier configuration information, where the special subframe includes all or some of gap symbols, and the gap symbols are symbols that are completely or partly occupied by the channel listening duration.

Specifically, in this embodiment of the present invention, the determining a special subframe in the first secondary carrier according to the obtained first carrier configuration information may include: determining a channel occupancy end time point or a channel listening start time point of the first secondary carrier according to information such as the maximum continuous channel occupancy duration, the channel listening duration, and the channel occupancy start reference time point and/or the channel listening start reference time point included in the first carrier configuration information, using M symbols after the determined channel occupancy end time point or the determined channel listening start time point as the gap symbols, and using the subframe that includes all or some symbols of the M symbols as the special subframe, where the M symbols may be determined according to the channel listening duration, and M is a positive integer that is greater than or equal to 1. Specifically, the M symbols may be specifically one or more symbols partly or completely occupied by the channel listening duration, which is not further described in this embodiment of the present invention.

Further, ending of channel occupancy of the first secondary carrier may be limited to a subframe boundary, or ending is not limited to a subframe boundary, and when ending of channel occupancy of the first secondary carrier is limited to the subframe boundary, corresponding subframe boundary information such as subframe boundary information of a primary carrier or subframe boundary information of a second secondary carrier of the terminal needs to be obtained. Therefore, correspondingly, when ending of channel occupancy of the first secondary carrier is limited to the subframe boundary, the terminal further needs to perform subframe boundary detection to determine subframe boundary information such as subframe boundary information of the primary carrier or subframe boundary information of the second secondary carrier of the terminal. Correspondingly, the determining a special subframe in the non-contiguous secondary carrier according to the obtained first carrier configuration information may include: determining the channel occupancy end time point or the channel listening start time point of the first secondary carrier according to the maximum continuous channel occupancy duration, the channel listening duration, the channel occupancy start reference time point and/or the channel listening start reference time point, and detected subframe boundary information included in the first carrier configuration information, using the M symbols after the determined channel occupancy end time point or the determined channel listening start time point as the gap symbols, and using the subframe that includes all or some symbols of the M symbols as the special subframe.

Step 203: Use all symbols except the gap symbols in the special subframe as symbols that can be occupied by a PDCCH and/or a PDSCH, and correspondingly receive or decode the PDCCH and/or the PDSCH in the special subframe according to the determined symbols that can be occupied by the PDCCH and/or the PDSCH.

Specifically, the using all symbols except the gap symbols in the special subframe as symbols that can be occupied by a PDCCH and/or a PDSCH includes: if it is determined that the first carrier configuration information carries symbol location indication information used to indicate a PDSCH start symbol location, using, according to the PDSCH start symbol location indicated in the symbol location indication information, each non-gap symbol after the PDSCH start symbol location in the special subframe as a symbol that can be occupied by the PDSCH, where the symbol location indication information is sent to the terminal when the network-side device determines that the first secondary carrier is a cross-scheduled carrier; or reading a PCFICH from a first symbol of the special subframe, determining, according to the PCFICH, the symbols that can be occupied by the PDCCH, and using all symbols except the gap symbols and the symbols that can be occupied by the PDCCH in the special subframe as the symbols that can be occupied by the PDSCH; or reading a PCFICH from an $(M+1)^{th}$ symbol of the special subframe, determining, according to the PCFICH, the symbols that can be occupied by the PDCCH, and using all symbols except the gap symbols and the symbols that can be occupied by the PDCCH in the special subframe as the symbols that can be occupied by the PDSCH.

It should be noted that, the terminal may perform the following operations when determining that the first carrier configuration information does not carry symbol location indication information used to indicate a PDSCH start symbol location: for any special subframe, reading a PCFICH from a first symbol of the special subframe or reading a PCFICH from an $(M+1)^{th}$ symbol of the special subframe, determining, according to the PCFICH, the symbols that can be occupied by the PDCCH, using all symbols except the gap symbols and the symbols that can be occupied by the PDCCH in the special subframe as the symbols that can be occupied by the PDSCH.

Further, it should be noted that, in this embodiment of the present invention, for any special subframe, when it is determined that all symbols in the special subframe are gap symbols, that is, the channel listening duration may occupy a duration occupied by the entire subframe, the terminal may further stop corresponding receiving or decoding performed on the PDCCH and/or the PDSCH in the special subframe.

Further, in this embodiment of the present invention, the method may further include: for any gap symbol, performing energy detection on the gap symbol, and when determining that detected energy is higher than a specified energy threshold, stopping receiving or decoding the special subframe that includes all or some symbols of the gap symbols; and/or, the method may further include: monitoring whether a carrier release message for the first secondary carrier is received from the network-side device, and if yes, stopping a data receiving or decoding operation performed on the first secondary carrier.

Further, in this embodiment of the present invention, the method may further include: receiving second carrier configuration information delivered for the first secondary carrier by the network-side device, where the second carrier configuration information may include any one or more types of the following information: system broadcast information of the first secondary carrier, where the system broadcast information can indicate that the first secondary carrier includes a common channel, where the common channel includes any one or more of a PBCH, a PSS, an SSS, or a reference signal; first indication information, where the first indication information is used to indicate that the first secondary carrier does not include a common channel; or second indication information, where the second indication information is used to indicate that a common channel used in the first secondary carrier is a common channel in an extended format; and determining, according to the second carrier configuration information, whether the first secondary carrier includes the common channel, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel; or determining, according to the second carrier configuration information, whether the common channel in the extended format is used in the first secondary carrier, and when a determining result is yes, when receiving or decoding the PDCCH and/or the PDSCH in the subframe in the first secondary carrier, excluding, from the symbols that can be occupied by the PDCCH and/or the PDSCH in the subframe, symbols occupied by the common channel in the extended format; or when a determining result is no, when receiving or decoding the PDCCH and/or the PDSCH in the subframe in the first secondary carrier, skipping excluding, from the symbols that can be occupied by the PDCCH and/or the PDSCH in the subframe, symbols occupied by the common channel in the extended format.

Specifically, in this embodiment of the present invention, the determining, according to the second carrier configuration information, whether the first secondary carrier includes the common channel, may include: if it is determined that the second carrier configuration information includes the first indication information, or it is determined that the second carrier configuration information does not include the system broadcast information, determining that the first secondary carrier does not include the common channel; or if it is determined that the second carrier configuration information does not include the first indication information, or it is determined that the second carrier configuration information includes the system broadcast information, determining that the first secondary carrier includes the common channel.

Similarly, the determining, according to the second carrier configuration information, whether the common channel in the extended format is used in the first secondary carrier, may include: if it is determined that the second carrier configuration information includes the second indication information, determining that the common channel in the extended format is used in the first secondary carrier; or if it is determined that the second carrier configuration information does not include the second indication information, determining that a common channel in a non-extended format is used in the first secondary carrier.

That is, in the technical solution of Embodiment 11 of the present invention, for any non-contiguous secondary carrier, a terminal can determine a special subframe in the non-contiguous secondary carrier according to a maximum continuous channel occupancy duration and a channel listening duration of the non-contiguous secondary carrier, and a channel occupancy start reference time point and/or a channel listening start reference time point of the non-contiguous secondary carrier that are obtained, where the special subframe includes all or some of gap symbols occupied by the channel listening duration, and for any special subframe, use all symbols except the gap symbols in the special subframe as symbols that can be occupied by a PDCCH and/or a PDSCH, and correspondingly receive or decode the PDCCH and/or the PDSCH in the special subframe according to the symbols that can be occupied by the PDCCH and/or the PDSCH. In this way, a currently existing problem that resource utilization is low because a gap symbol caused by a CCA cannot be excluded from an entire subframe is resolved, and channel utilization is improved if a channel is discontinuously occupied.

In addition, for any carrier, when the terminal receives or decodes a PDCCH and/or a PDSCH in a subframe in the carrier, the terminal may flexibly select to exclude or skip excluding, according to received indication information about whether a common channel is included, symbols occupied by the common channel. In this way, a currently existing problem that a throughput is increased because a terminal still excludes, according to a specific location occupied by a common channel, symbols occupied by the common channel in a secondary carrier in which no corresponding common channel is configured, is resolved, and on a basis of improving flexibility of excluding, by the terminal, the symbols occupied by the common channel, an effect of reducing a throughput loss and improving efficiency of receiving or decoding the PDCCH and/or PDSCH by the terminal is achieved.

Embodiment 12

In Embodiment 12 of the present invention, assuming that actions are performed by the terminal in Embodiment 4 or Embodiment 8 of the present invention, the subframe processing method in Embodiment 10 of the present invention is further described. The subframe processing method may include the following steps.

Step 1: A terminal receives first carrier configuration information delivered for a first carrier by a network-side device, where the first carrier configuration information may include any one or more types of the following information: system broadcast information of the first carrier, where the system broadcast information can indicate that the first carrier includes a common channel, where the common channel includes any one or more of a PBCH, a PSS, an SSS, or a reference signal; first indication information, where the first indication information is used to indicate that the first carrier does not include a common channel; or second indication information, where the second indication information is used to indicate that a common channel used in the first carrier is a common channel in an extended format.

In this embodiment of the present invention, the first carrier may be any non-contiguous carrier or any contiguous carrier configured by the network-side device for the terminal, which is not limited in this embodiment of the present invention.

Step 2: Determine, according to the first carrier configuration information, whether the first carrier includes the common channel, and when a determining result is yes, when receiving or decoding a PDCCH and/or a PDSCH in a subframe in the first carrier, exclude, from symbols that can be occupied by the PDCCH and/or the PDSCH in the subframe, symbols occupied by the common channel; or when a determining result is no, when receiving or decoding a PDCCH and/or a PDSCH in a subframe in the first carrier, skip excluding, from symbols that can be occupied by the PDCCH and/or the PDSCH in the subframe, symbols occupied by the common channel; or determine, according to the first carrier configuration information, whether the common channel in the extended format is used in the first carrier, and when a determining result is yes, when receiving or decoding a PDCCH and/or a PDSCH in a subframe in the first carrier, exclude, from symbols that can be occupied by the PDCCH and/or the PDSCH in the subframe, symbols occupied by the common channel in the extended format; or when a determining result is no, when receiving or decoding a PDCCH and/or a PDSCH in a subframe in the first carrier, skip excluding, from symbols that can be occupied by the PDCCH and/or the PDSCH in the subframe, symbols occupied by the common channel in the extended format.

Specifically, in this embodiment of the present invention, the determining, according to the first carrier configuration information, whether the first carrier includes the common channel, may include: if it is determined that the first carrier configuration information includes the first indication information, or it is determined that the first carrier configuration information does not include the system broadcast information, determining that the first carrier does not include the common channel; or if it is determined that the first carrier configuration information does not include the first indication information, or it is determined that the first carrier configuration information includes the system broadcast information, determining that the first carrier includes the common channel.

Similarly, the determining, according to the first carrier configuration information, whether the common channel in the extended format is used in the first carrier, may include: if it is determined that the first carrier configuration information includes the second indication information, determining that the common channel in the extended format is used in the first carrier; or if it is determined that the first carrier configuration information does not include the second indication information, determining that a common channel in a non-extended format is used in the first carrier.

That is, in the technical solution of Embodiment 12 of the present invention, for any carrier configured for a terminal, when the terminal receives or decodes a PDCCH and/or a PDSCH in a subframe in the carrier, the terminal may flexibly select to exclude or skip excluding, according to received indication information about whether a common channel is included, symbols occupied by the common channel. In this way, a currently existing problem that a throughput is increased because a terminal still excludes, according to a specific location occupied by a common channel, symbols occupied by the common channel in a secondary carrier in which no corresponding common channel is configured, is resolved, and on a basis of improving flexibility of excluding, by the terminal, the symbols occupied by the common channel, an effect of reducing a throughput loss and improving efficiency of receiving or decoding the PDCCH and/or PDSCH by the terminal is achieved.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An apparatus, comprising:
 a processor; and
 a non-transitory storage medium including executable instructions, wherein the executable instructions include instructions for:
  receiving configuration information of a first carrier from a network device, wherein the configuration information indicates whether the first carrier comprises a common channel;
  determining, according to the configuration information, whether the first carrier comprises the common channel; and
  receiving or decoding a physical downlink shared channel (PDSCH) carried in the first carrier according to the following:
   in response to determining that the first carrier comprises the common channel, and when receiving or decoding the PDSCH carried in the first carrier, excluding, from symbols allocated to be occupied by the PDSCH, symbols allocated to be occupied by the common channel; or
   in response to determining that the first carrier does not comprise the common channel, and when receiving or decoding the PDSCH carried in the first carrier, skipping excluding, from symbols allocated to be occupied by the PDSCH, symbols allocated to be occupied by the common channel.

2. The apparatus according to claim 1, wherein the common channel is a common broadcast channel.

3. The apparatus according to claim 1, wherein the common channel is a common synchronization channel.

4. The apparatus according to claim 1, wherein the common channel is used to transmit a synchronization signal.

5. The apparatus according to claim 1, wherein the common channel comprises a physical broadcast channel (PBCH), a primary synchronization signal (PSS), and a secondary synchronization signal (SSS).

6. The apparatus according to claim 5, wherein the common channel further comprises a reference signal.

7. A method, comprising:
receiving, by a terminal, configuration information of a first carrier from a network device, wherein the configuration information indicates whether the first carrier comprises a common channel;
determining, according to the configuration information, whether the first carrier comprises the common channel; and
receiving or decoding a physical downlink shared channel (PDSCH) carried in the first carrier according to the following:
in response to determining that the first carrier comprises the common channel, and when receiving or decoding the PDSCH carried in the first carrier, excluding, from symbols allocated to be occupied by the PDSCH, symbols allocated to be occupied by the common channel; or
in response to determining that the first carrier does not comprise the common channel, and when receiving or decoding the PDSCH carried in the first carrier, skipping excluding, from symbols that are allocated to be occupied by the PDSCH, symbols allocated to be occupied by the common channel.

8. The method according to claim 7, wherein the common channel is a common broadcast channel.

9. The method according to claim 7, wherein the common channel is a common synchronization channel.

10. The method according to claim 7, wherein the common channel is used to transmit a synchronization signal.

11. The method according to claim 7, wherein the common channel comprises a physical broadcast channel (PBCH), a primary synchronization signal (PSS), and a secondary synchronization signal (SSS).

12. The method according to claim 11, wherein the common channel further comprises a reference signal.

13. A non-transitory computer-readable storage medium, comprising executable instructions for execution by a computer, wherein the executable instructions comprise instructions for:
receiving configuration information of a first carrier from a network device, wherein the configuration information indicates whether the first carrier comprises a common channel;
determining, according to the configuration information, whether the first carrier comprises the common channel; and
receiving or decoding a physical downlink shared channel (PDSCH) carried in the first carrier according to the following:
in response to determining that the first carrier comprises the common channel, and when receiving or decoding the PDSCH carried in the first carrier, excluding, from symbols allocated to be occupied by the PDSCH, symbols allocated to be occupied by the common channel; or
in response to determining that the first carrier does not comprise the common channel, and when receiving or decoding the PDSCH carried in the first carrier, skipping excluding, from symbols that are allocated to be occupied by the PDSCH, symbols allocated to be occupied by the common channel.

14. The non-transitory computer-readable storage medium according to claim 13, wherein the common channel is a common broadcast channel.

15. The non-transitory computer-readable storage medium according to claim 13, wherein the common channel is a common synchronization channel.

16. The non-transitory computer-readable storage medium according to claim 13, wherein the common channel is used to transmit a synchronization signal.

17. The non-transitory computer-readable storage medium according to claim 13, wherein the common channel comprises a physical broadcast channel (PBCH), a primary synchronization signal (PSS), and a secondary synchronization signal (SSS).

18. The non-transitory computer-readable storage medium according to claim 17, wherein the common channel further comprises a reference signal.

* * * * *